(12) United States Patent
Ariyama

(10) Patent No.: US 11,825,186 B2
(45) Date of Patent: Nov. 21, 2023

(54) PROGRAM, INFORMATION PROCESSING DEVICE, AND INFORMATION PROCESSING SYSTEM

(71) Applicant: Sony Group Corporation, Tokyo (JP)

(72) Inventor: Takaaki Ariyama, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 81 days.

(21) Appl. No.: 17/473,237

(22) Filed: Sep. 13, 2021

(65) Prior Publication Data

US 2022/0086334 A1 Mar. 17, 2022

(30) Foreign Application Priority Data

Sep. 15, 2020 (JP) .................................. 2020-154917

(51) Int. Cl.
*H04N 23/62* (2023.01)
*G06T 7/00* (2017.01)
*H04N 23/60* (2023.01)
*H04N 23/80* (2023.01)
*H04N 23/617* (2023.01)

(52) U.S. Cl.
CPC ............ *H04N 23/62* (2023.01); *G06T 7/0002* (2013.01); *H04N 23/617* (2023.01); *H04N 23/64* (2023.01); *H04N 23/80* (2023.01); *G06T 2207/30168* (2013.01)

(58) Field of Classification Search
CPC ...... H04N 23/62; H04N 23/617; H04N 23/64; H04N 23/80; H04N 23/631; H04N 23/661; G06T 7/0002; G06T 2207/30168
See application file for complete search history.

(56) References Cited

U.S. PATENT DOCUMENTS

| 6,980,233 B1 * | 12/2005 | Hirasawa | ............... | H04N 23/64 |
| | | | | 348/E5.042 |
| 2017/0230586 A1 * | 8/2017 | Takahashi | ............ | H04N 23/633 |

FOREIGN PATENT DOCUMENTS

JP 2014-068228 A 4/2014

* cited by examiner

*Primary Examiner* — Yogesh K Aggarwal
(74) *Attorney, Agent, or Firm* — Michael Best & Friedrich LLP

(57) ABSTRACT

Image quality according to user preferences can be suitably reflected in an image capturing device (camera).

A program causes a computer to function as an analysis-object image quality adjusting unit that generates an analysis-object image. The analysis-object image quality adjusting unit generates an adjusted analysis-object image used along with an analysis-object RAW image to decide an image quality settings parameter of a captured image acquired by an image capturing device. In this case, the adjusted analysis-object image is generated by performing image quality adjustment processing on an analysis-object RAW image that is different from an adjustment-object RAW image, on the basis of image quality adjustment information indicating an image quality adjustment value of image quality adjustment processing as to the adjustment-object RAW image.

17 Claims, 20 Drawing Sheets

Fig. 1
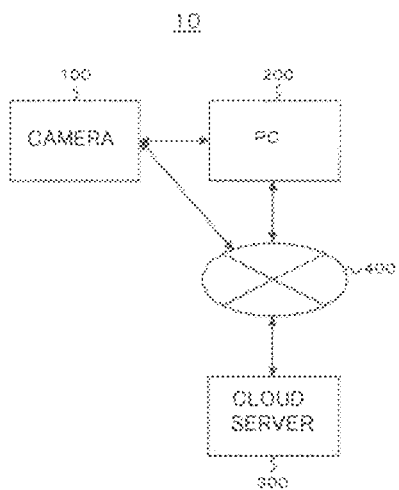
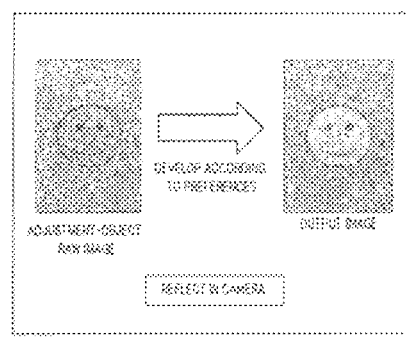
FIG. 2A
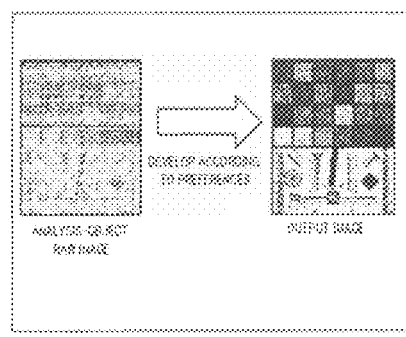
FIG. 2B

PROGRAM, INFORMATION PROCESSING DEVICE, AND INFORMATION PROCESSING SYSTEM

It should be understood by those skilled in the art that various modifications, combinations, sub-combinations and alterations may occur depending on design requirements and other factors insofar as they are within the scope of the appended claims or the equivalents thereof.

BACKGROUND OF THE INVENTION

1. Field of the Invention

The present technology relates to a program, an information processing device, and an information processing system, and more specifically relates to a program and the like that can suitably reflect image quality according to user preferences in an image capturing device.

2. Description of the Related Art

Output formats of images obtained when a user takes photographs using a digital camera or a smartphone are largely classified into the two types of the Joint Photographic Experts Group (JPG) format and the RAW image format. JPG is a format in which signal processing is performed by the camera, and is a general-purpose format that almost all image viewing applications for personal computers (PCs) handle.

The RAW image format is a format that assumes that processing and editing will be performed later. A feature of the RAW image format is that users can freely adjust adjustment items in RAW developing applications as they please, and thus can finish to image quality of their preferences. Photographs in which RAW data is processed into desirable image quality are broadly available to the public to view, and users who view these have more opportunities to be exposed to many photographs with desirable image quality.

It can be said that JPG has high immediacy but low expandability, while RAW has low immediacy and is troublesome but expandability is high. If captured images with the same image quality as when RAW data is processed could be instantaneously acquired, this would be advantageous in that users would be able to, whenever they desired to, acquire captured images with image quality in accordance with user preferences when photographing, while reducing trouble for the users.

For example, Japanese Patent Application Publication No. 2014-068228 describes presenting a plurality of images obtained by executing image editing processing using a plurality of processing contents set in advance, as to thumbnail image data that is accessory information of image data, enabling the user to predict the processing contents of the image data, and enabling easy acquisition of an image according to user preferences.

SUMMARY OF THE INVENTION

According to an embodiment of the present technology, there is provided an arrangement that enables image quality according to user preferences to be suitably reflected in an image capturing device (camera).

A concept of an embodiment of the present technology is a program that causes a computer to function as an analysis-object image quality adjusting unit that, by performing image quality adjustment processing on an analysis-object RAW image that is different from an adjustment-object RAW image, on the basis of image quality adjustment information indicating an image quality adjustment value of image quality adjustment processing as to the adjustment-object RAW image, generates an adjusted analysis-object image used along with the analysis-object RAW image to decide an image quality settings parameter of a captured image acquired by an image capturing device.

An embodiment of the present technology is a program that causes a computer to function as an analysis-object image quality adjusting unit that generates an analysis-object image. The analysis-object image quality adjusting unit generates an adjusted analysis-object image used along with an analysis-object RAW image to decide an image quality settings parameter of a captured image acquired by an image capturing device. In this case, the adjusted analysis-object image is generated by performing image quality adjustment processing on an analysis-object RAW image that is different from an adjustment-object RAW image, on the basis of image quality adjustment information indicating an image quality adjustment value of image quality adjustment processing as to the adjustment-object RAW image.

Thus, according to an embodiment of the present technology, an adjusted analysis-object images used along with analysis-object RAW images for deciding image quality settings parameters for captured images acquired at the image capturing device is generated, by performing image quality adjustment processing as to analysis-object RAW images on the basis of image quality adjustment information indicating image quality adjustment values of image quality adjustment processing performed as to adjustment-object RAW images. In this case, image quality settings parameters can be decided for captured images using analysis-object RAW images and adjusted analysis-object images that are suitable for analysis, and image quality according to user preferences can be reflected in the image capturing device with better precision.

Note that in the embodiment of the present technology, for example, the image quality adjustment information may include information indicating at least one adjustment value out of color adjustment, brightness adjustment, tone adjustment, sharpness adjustment, and noise adjustment. Thus, image quality of user preferences corresponding to at least one out of color adjustment, brightness adjustment, tone adjustment, sharpness adjustment, and noise adjustment, can be reflected in the image capturing device.

Also, in the embodiment of the present technology, for example, the analysis-object image quality adjusting unit may generate the adjusted analysis-object image by performing the same image quality adjustment processing on the analysis-object RAW image as the image quality adjustment processing as to the adjustment-object RAW image. Thus, the same image quality adjustment processing as the image quality adjustment processing performed on the image that the user set to preferred image quality can be reflected in the image capturing device.

Also, in the embodiment of the present technology, for example, the image quality adjustment information may be information indicating adjustment values of a plurality of image quality adjustment items, and the analysis-object image quality adjusting unit may generate the adjusted analysis-object image on the basis of selected image quality adjustment information indicating an adjustment value of an image quality adjustment item selected by a user out of the plurality of image quality adjustment items. Thus, image quality corresponding to an image quality adjustment item selected by the user can be reflected in the image capturing device.

Also, in the embodiment of the present technology, for example, the analysis-object RAW image may be an image provided from an external device that is different from a device including the computer. In this case, the analysis-object RAW image can be edited or changed as appropriate in the external device, and the memory capacity used in the device including the computer can also be suppressed.

Also, in the embodiment of the present technology, for example, the image quality adjustment information may be information indicating adjustment values of a plurality of image quality adjustment items, and the analysis-object RAW image may have a plurality of image regions, and each of the plurality of image regions may correspond to at least one of the plurality of image quality adjustment items. Thus, image quality settings parameters for matching a plurality of image quality adjustment items can be calculated (decided) with good precision, with a single analysis-object RAW image.

Also, in the embodiment of the present technology, for example, the analysis-object image quality adjusting unit may generate the adjusted analysis-object image on the basis of the image quality adjustment information, in accordance with an operation of reflecting image quality settings by the user. In this case, image quality adjustment information to be reflected in the analysis-object RAW image can be made to indicate image quality adjustment values at the time of the user performing image quality adjustment processing to make the adjustment-object RAW image to conform to the image quality according to the preferences of the user.

Also, in the embodiment of the present technology, for example, the analysis-object image quality adjusting unit may correlate the adjusted analysis-object image and image type information indicating a type of image contents of the adjustment-object RAW image. Thus, image quality adjustment processing that differs for each type of image contents of the adjustment-object RAW image can be reflected in the image capturing device.

Also, in the embodiment of the present technology, for example, the image quality settings parameter may be decided for each image type information indicating the type of image contents of the adjustment-object RAW image. Thus, image quality adjustment processing that differs for each type of image contents of the adjustment-object RAW image can be reflected in the image capturing device. In this case, for example, the image type information may include information indicating a type of subject. This enables image quality adjustment processing that differs for each type of subject to be reflected in the image capturing device.

Also, in the embodiment of the present technology, for example, the analysis-object image quality adjusting unit may select the analysis-object RAW image from a plurality of analysis-object RAW candidate images that are candidates for the analysis-object RAW image, on the basis of photographing conditions information indicating photographing conditions of the adjustment-object RAW image. In this case, selecting an analysis-object RAW image matching the photographing conditions of the adjustment-object RAW image enables the image quality according to user preferences to be reflected in the image capturing device with better precision.

Also, in the embodiment of the present technology, for example, the program may cause the computer to function as an image quality settings parameter deciding unit that decides the image quality settings parameter on the basis of the analysis-object RAW image and the adjusted analysis-object image. Thus, the image quality settings parameter can be decided by this program.

Also, in the embodiment of the present technology, for example, the image quality settings parameter deciding unit may decide the image quality settings parameter such that a difference between a first image quality evaluation value indicating evaluation of image quality of an adjusted image generated by performing image quality adjustment processing on the analysis-object RAW image on the basis of the image quality settings parameter, and a second image quality evaluation value indicating evaluation of image quality of the adjusted analysis-object image, is no greater than a predetermined value. In this case, while manually performing calibration of image quality settings parameters requires a great number of man-hours, image quality settings parameters can be suitably calculated (decided) without human intervention by using this system.

Also, in the embodiment of the present technology, for example, the first image quality evaluation value and the second image quality evaluation value may be evaluation values that evaluate at least one out of color reproducibility, contrast, feel of resolution, and feel of noise. Thus, the image quality settings parameter can be decided to match at least one image quality out of color reproducibility, contrast, feel of resolution, and feel of noise.

Also, in the embodiment of the present technology, for example, the program may cause the computer to function as an adjustment-object image quality adjusting unit that executes image quality adjustment processing on the adjustment-object RAW image, on the basis of the image quality adjustment information. Thus, image quality adjustment processing of an adjustment-object RAW image can be performed by this program.

Also, in the embodiment of the present technology, for example, the image quality adjustment value may be decided by an image quality adjustment operation performed on the adjustment-object RAW image by the user. Thus, image quality adjustment operations performed by the user can be reflected in image quality adjustment processing as to the analysis-object RAW image.

A concept of another embodiment of the present technology is an information processing device including an analysis-object image quality adjusting unit that, by performing image quality adjustment processing on an analysis-object RAW image that is different from an adjustment-object RAW image, on the basis of image quality adjustment information indicating an image quality adjustment value of image quality adjustment processing as to the adjustment-object RAW image, generates an adjusted analysis-object image used along with the analysis-object RAW image to decide an image quality settings parameter of a captured image acquired by an image capturing device.

A concept of yet another embodiment of the present technology is an information processing system including an information processing device and a server.

The information processing device includes an analysis-object image quality adjusting unit that, by performing image quality adjustment processing on an analysis-object RAW image that is different from an adjustment-object RAW image, on the basis of image quality adjustment information indicating an image quality adjustment value of image quality adjustment processing as to the adjustment-object RAW image, generates an adjusted analysis-object image used along with the analysis-object RAW image to decide an image quality settings parameter of a captured image acquired by an image capturing device.

The server includes an image quality settings parameter deciding unit that decides the image quality settings parameter on the basis of the analysis-object RAW image, and the adjusted analysis-object image generated at the analysis-object image quality adjusting unit.

BRIEF DESCRIPTION OF THE DRAWINGS

FIG. 1 is a block diagram illustrating a configuration example of an information processing system according to an embodiment;

FIGS. 2A and 2B are diagrams for describing processing by an application 1 and an application 2 of a personal computer (PC);

DESCRIPTION OF THE PREFERRED EMBODIMENTS

Figure 3:
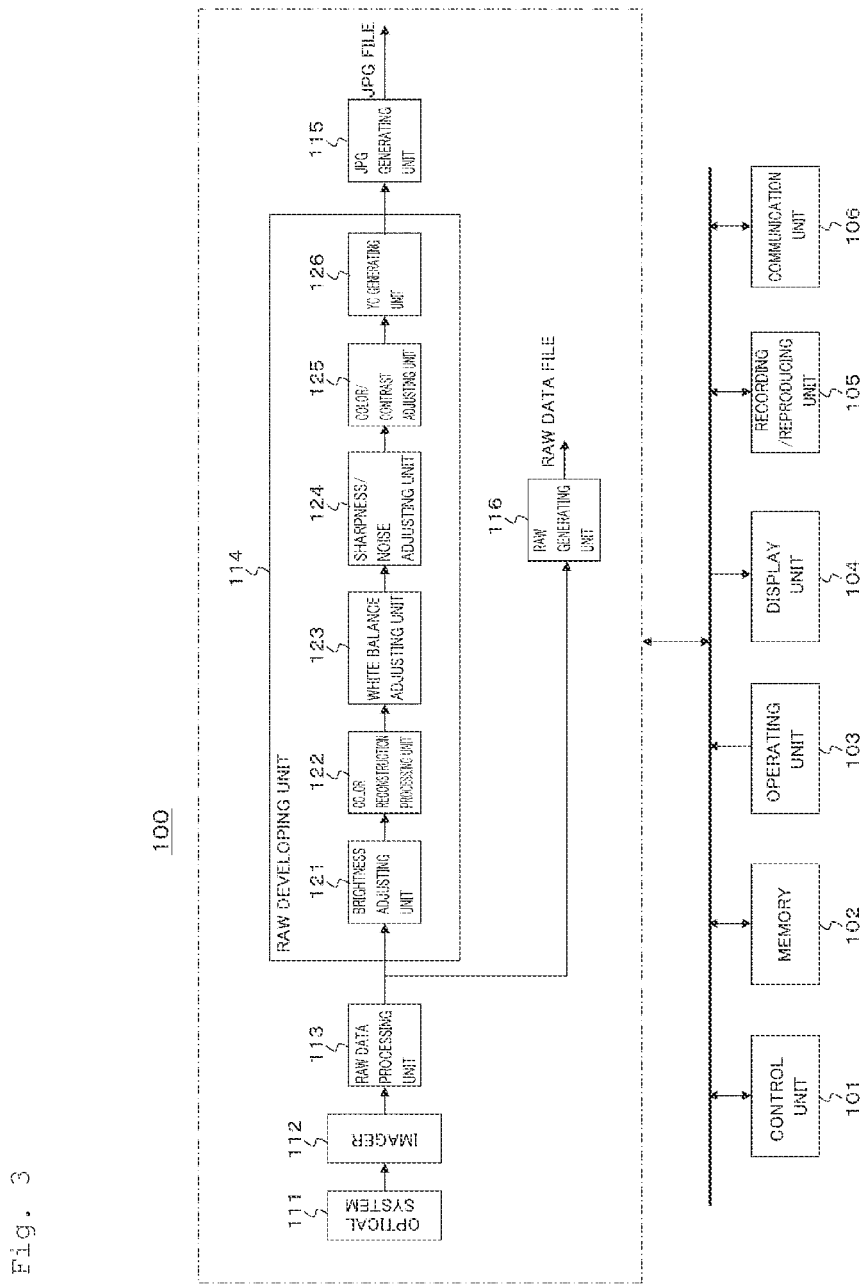
FIG. 3 is a block diagram illustrating a configuration example of a camera.

Description of the preferred embodiments (hereinafter referred to as "embodiment") will be given below. Note that description will be given in the following order.
1. Embodiment
2. Modifications 1. Embodiment Information Processing System FIG. 1 illustrates a configuration example of an information processing system 10 according to the embodiment. This information processing system 10 includes a camera 100, a personal computer (PC) 200, and a cloud server 300. The camera 100 and the PC 200 are connected by a predetermined digital interface, such as a Universal Serial Bus (USB) cable, for example. The PC 200 is connected to the cloud server 300 via a network 400 such as the Internet or the like. The camera 100 is also connectable to the cloud server 300 via the network 400.

The camera 100 performs developing processing on a RAW image acquired by photographing a subject and generates a JPG file, which is recorded in a recording medium, or transmitted to an external device as appropriate. The camera 100 also generates a RAW image file on the basis of the RAW image acquired by photographing a subject, which is recorded in the recording medium, or transmitted to the external device as appropriate. Note that while an arrangement in which a JPG file is generated is described here, the file may be of another format, such as a bitmap (BMP) file or the like, for example. Description will be made below regarding an arrangement in which a JPG file is generated.

The PC 200 has an application 1 and an application 2. The application 1 performs developing processing on a RAW image acquired by photographing a subject (adjustment-object RAW image), and generates a JPG file as an output image, as schematically illustrated in FIG. 2A. Note that while an arrangement in which a JPRG file is generated is described here, the file may be of another format, such as a bitmap (BMP) file or the like, for example. Description will be made below regarding an arrangement in which a JPG file is generated.

In this case, image quality adjustment is performed on the basis of image quality adjustment operations of the user, and developing is performed to yield image quality according to user preferences. The user performs operations such as, for example, color adjustment, brightness adjustment, tone adjustment, sharpness adjustment, noise adjustment, and so forth.

Now, developing performed by the application 1 and developing performed in the camera 100 will be described. Generally, signal processing in the developing performed by the application 1 and developing performed in the camera 100 have differences in precision, processing order, algorithms, and so forth. A feature or the present technology is to enable images, closest to images completed according to preference by the user using the application 1, to be obtainable when photographing with the camera 100, even if the processing itself differs.

In this case, an output image is displayed on a display unit of the PC 200 along with the adjustment-object RAW image, and the user can confirm whether or not the image quality of the output image is the preferred image quality. When the image quality of the output image reaches the preferred image quality as a result of image quality adjustment operations, for example, the user can cause transition to processing by the application 2, and further to calculation processing of image quality settings parameters for captured images acquired by the camera 100, by performing a pressing operation of a "REFLECT IN CAMERA" button displayed on the display unit of the PC 200.

The above-described operation of the user pressing the "REFLECT IN CAMERA" button corresponds to an image quality settings reflecting operation by the user. In response to this operation, the application 1 notifies the application 2 of image quality adjustment information. The application 2 performs developing processing on an analysis-object RAW image, and generates an adjusted analysis-object image. Thus, image quality adjustment information to be reflected in the analysis-object RAW image can be made to indicate image quality adjustment values at the time of the user performing image quality adjustment processing to make the adjustment-object RAW image to conform to the image quality according to the preferences of the user.

In this case, the image quality adjustment values are decided by image quality adjustment operations performed by the user as to the adjustment-object RAW image as described above, and the image quality adjustment operations performed by the user can be reflected in image quality adjustment processing as to analysis-object RAW images.

The application 2 performs developing processing on a RAW image suitable for analysis (analysis-object RAW image), and generates a JPG file as an output image, as schematically illustrated in FIG. 2B. The developing processing in this case is the same processing as the developing processing by the application 1, and image quality adjustment processing is performed on the basis of image quality adjustment information indicating image quality adjustment values of the image quality adjustment processing by the application 1. Accordingly, the output image of the application 2 is an adjusted analysis-object image.

In this case, the adjusted analysis-object image may be generated by performing the same image quality adjustment processing on the analysis-object RAW image as the image quality adjustment processing performed on the adjustment-object RAW image. Accordingly, image quality adjustment processing that is the same as the image quality adjustment processing performed for the image set to the image quality that the user prefers can be reflected in the camera 100.

As described above, the user performs operations such as, for example, color adjustment, brightness adjustment, tone adjustment, sharpness adjustment, noise adjustment, and so forth, relating to developing processing by the application 1. The image quality adjustment processing in the developing processing by the application 2 is performed on the basis of image quality adjustment information indicating image quality adjustment values in the image quality adjustment processing by the application 1, as described above, and this image quality adjustment information may include information indicating at least one adjustment value out of color adjustment, brightness adjustment, tone adjustment, sharpness adjustment, and noise adjustment. Thus, image quality according to preferences of the user corresponding to at least one out of color adjustment, brightness adjustment, tone adjustment, sharpness adjustment, and noise adjustment can be reflected in the camera 100.

Now, the analysis-object RAW image will be described. This analysis-object RAW image is created to precisely calculate image quality settings parameters (parameter group), such as color reproducibility, portions for matching contrast, feel of resolution, portions for matching feel of noise, and so forth. A feature of this analysis-object RAW image is that processing contents can be reflected more accurately than predicting contents from a common image that has been processed.

This analysis-object RAW image itself is not limited, and the form may be decided in accordance with the intent, such as being created to calculate finer color differences, or being created to calculate finer contrast differences, for example.

The image quality adjustment information indicating the image quality adjustment values in the image quality adjustment processing by the application 1 described above is information indicating adjustment values of a plurality of image quality adjustment items. Examples of the image quality adjustment items here include color reproducibility, contrast, feel of resolution, feel of noise, and so forth. The analysis-object RAW image has a plurality of image regions for example, with each of the plurality of image regions corresponding to at least one of a plurality of image quality adjustment items. Thus, image quality settings parameters for matching the plurality of image quality adjustment items can be calculated with good precision, with a single analysis-object RAW image.

The analysis-object RAW image conceivably includes an image region (chart) in which color patches are arrayed, such as in a widely-used color chart, in order to evaluate color reproducibility, contrast, and feel of noise, as illustrated in FIG. 2B, for example. The analysis-object RAW image may also include image regions for evaluating each of color reproducibility, contrast, and feel of noise, instead of the color chart.

The analysis-object RAW image does not need to be singularly defined, and images to be used may be changed as appropriate, in accordance with items to be evaluated. For example, an arrangement may be made in which an image including a color patch image region is used if evaluating color reproducibility with good precision is desired, and an image including an image region by which both color reproducibility and feel of resolution can be evaluated with good precision is used if evaluating both is desired.

The PC 200 may use an analysis-object RAW image stored in its own memory (storage unit) as the analysis-object RAW image, or may be provided therewith by an external device, such as the cloud server 300 for example. Being provided therewith by an external device in this way enables the analysis-object RAW image to be edited or changed as appropriate, and the memory capacity used in the PC 200 can be suppressed.

Returning to FIG. 1, the cloud server 300 decides the image quality settings parameters of captured images acquired by the camera 100, by using the analysis-object RAW image and the adjusted analysis-object image generated by the application 2 of the PC 200.

In this case, the image quality settings parameters are decided such that the difference between a first image quality evaluation value indicating evaluation of the image quality of an adjusted image generated by subjecting the analysis-object RAW image to image quality adjustment processing on the basis of the image quality settings parameters, and a second image quality evaluation value indicating evaluation of the image quality of the adjusted analysis-object image, is no greater than a predetermined value. For example, the first image quality evaluation value and the second image quality evaluation value are evaluation values evaluating at least one out of color reproducibility, contrast, feel of resolution, and feel of noise.

The image quality settings parameters decided at the cloud server 300 are supplied to the camera 100, either from the cloud server 300 via the PC 200, or directly from the cloud server 300, and used. Accordingly, the camera 100 can obtain captured images having image quality that is equivalent to an output image obtained by image quality adjustment processing on the basis of the image quality adjustment operations performed by the user using the application 1 of the PC 200.

Configuration Example of Camera

FIG. 3 illustrates a configuration example of the camera 100. The camera 100 has a control unit 101, memory 102, an operating unit 103, a display unit 104, a recording/reproducing unit 105, and a communication unit 106. The camera 100 also has an optical system 111, an imager 112, a RAW data processing unit 113, a RAW developing unit 114, a JPG generating unit 115, and a RAW generating unit 116. Note that the configuration shown here is one example, and part of the components may be omitted. Also, components other than the components shown here may further be included.

The control unit 101 is provided with a central processing unit (CPU), which controls the overall camera 100. The memory 102 stores control programs for the CPU. The memory 102 also makes up a work region for the CPU, and stores partway results and final results of processing by the CPU. The memory 102 further stores image quality settings parameters generated by the cloud server 300 and received by the later-described communication unit 106.

The operating unit 103 is configured of operating buttons, a touch panel, or the like, and is a portion by which the user can perform various types of operations of the camera 100. The display unit 104 is configured of a liquid crystal panel, an organic electroluminescence (EL) panel, or the like, and displays menu screens, settings screens, and so forth, in addition to captured images. The operating unit 103 and the display unit 104 make up a user interface.

The recording/reproducing unit 105 records, in a recording medium, JPG files and RAW image files generated as described later, and performs reproduction thereof as appropriate. In this case, the recording medium may be a removable recording medium such as a memory card or the like. The communication unit 106 communicates with external devices in a wired or wireless manner. In this embodiment, communication is performed with the PC 200, and with the cloud server 300 via the network 400.

The optical system 111 is provided with lenses such as a cover lens, a zoom lens, a focusing lens, and so forth, a diaphragm mechanism, and so forth. Light from a subject (incident light) is guided by the optical system 111 and collected at the imager 112. The imager 112 is a complementary metal oxide semiconductor (CMOS) type or charge coupled device (CCD) type imager or the like, for example. The imager 112 outputs image-capture signals as digital data to the RAW data processing unit 113 downstream.

The RAW data processing unit 113 subjects the RAW data output from the imager 112 to pixel defect correction, color mixture correction, flicker correction, and so forth. The RAW developing unit 114 performs processing of developing the RAW data processed at the RAW data processing unit 113 to obtain luminance/color-difference (YC) data.

The RAW developing unit 114 has a brightness adjusting unit 121, a color reconstruction processing unit 122, a white balance adjusting unit 123, a sharpness/noise adjusting unit 124, a color/contrast adjusting unit 125, and a YC generating unit 126.

The brightness adjusting unit 121 adjusts the brightness of the RAW data in accordance with the set parameters. The color reconstruction processing unit 122 performs color separation processing of the RAW data output from the brightness adjusting unit 121, so that image data for each pixel has color components of all of red (R), green (G), and blue (B). In a case of an imager 112 that uses a Bayer array color filter, for example, demosaicing processing is performed as the color separation processing.

The white balance adjusting unit 123 adjusts the white balance as to the RGB image data (data of three primary colors) output from the color reconstruction processing unit 122, in accordance with the set parameters. The sharpness/noise adjusting unit 124 adjusts the sharpness and noise of the RGB image data output from the white balance adjusting unit 123, in accordance with the set parameters.

The color/contrast adjusting unit 125 adjusts the color and contrast of the RGB image data output from the sharpness/nose adjusting unit 124, in accordance with the set parameters. The YC generating unit 126 subjects the RGB image data output from the color/contrast adjusting unit 125 to color gradation reproduction processing and gamma processing, and thereafter converts the RGB image data into YC signals (luminance signals (Y) and color-difference signals (Cb, Cr)), following a predetermined calculation expression.

The JPG generating unit 115 generates a JPG file on the basis of the YC signals output from the RAW developing unit 114 (YC generating unit 126). The JPG file generated in this way is recorded in the recording medium by the recording/reproducing unit 105, and is reproduced, used for image display, or transmitted to an external device via the communication unit 106, as appropriate.

Note that the user can adjust the parameters at each of the adjusting units of the RAW developing unit 114, by operating the operating unit 103. Also, image quality settings parameters decided at the cloud server 300 on the basis of user operations can be set as the parameters at each of the adjusting units of the RAW developing unit 114. In this case, the camera 100 can obtain a captured image (JPG image) having image quality that is equivalent to an output image obtained by image quality adjustment processing on the basis of the image quality adjustment operations performed by the user using the application 1 of the PC 200.

The RAW generating unit 116 generates a RAW data file on the basis of the RAW data processed by the RAW data processing unit 113. The RAW data contained in this RAW data file may be either uncompressed RAW data or compressed RAW data. The RAW data file generated in this way is recorded in the recording medium by the recording/reproducing unit 105, and is reproduced and transmitted to an external device via the communication unit 106, as appropriate.

Configuration Example of PC

Figure 4:
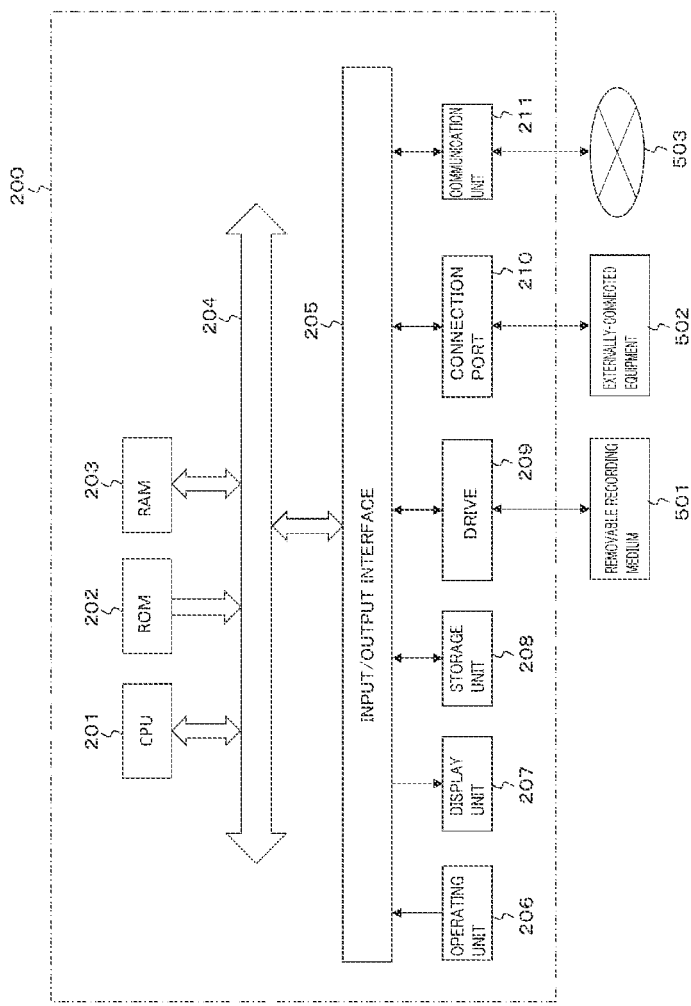
FIG. 4 is a block diagram illustrating a configuration example of a PC (cloud server)

FIG. 4 illustrates a configuration example of the PC 200. The PC 200 has a CPU 201, read only memory (ROM) 202, random-access memory (RAM) 203, a bus 204, an input/output interface 205, an operating unit 206, a display unit 207, a storage unit 208, a drive 209, a connection port 210, and a communication unit 211. Note that the configuration shown here is one example, and part of the components may be omitted. Also, components other than the components shown here may further be included.

The CPU 201 functions as an arithmetic processing unit or a control unit, for example, and controls all or part of operations of the components on the basis of various types of programs recorded in the ROM 202, the RAM 203, the storage unit 208, or a removable recording medium 501.

The ROM 202 is a unit that stores programs read by the CPU 201, data used in computation, and so forth. The RAM 203 temporarily or permanently stores, for example, programs read by the CPU 201, various types of parameters that change as appropriate when executing the programs, and so forth.

The CPU 201, the ROM 202, and the RAM 203 are connected to each other via the bus 204. At the same time, various types of components are connected to the bus 204 via the input/output interface 205.

The operating unit 206 accepts input of user operations, and outputs operation signals corresponding to the accepted operation input to the CPU 201. For example, a mouse, a keyboard, a touch panel, buttons, switches, levers, and so forth, are used as the operating unit 206. Further, a remote controller that is capable of transmitting control signals using infrared rays or other radio waves may be used as the operating unit 206.

The display unit 207 is configured of a liquid crystal display, an organic EL display, or the like, and displays various types of information under control of the CPU 201. The operating unit 206 and the display unit 207 make up a user interface here.

The storage unit 208 is a device for storing various types of data. For example, magnetic storage devices such as a hard disk drive (HDD), a semiconductor storage device, an optical storage device, a magneto-optical storage device, or the like, is used as the storage unit 208.

The drive 209 is a device that reads information recorded in the removable recording medium 501 such as, for example, a magnetic disk, an optical disc, a magneto-optical disc, semiconductor memory, or the like, and also writes information to the removable recording medium 501.

Examples of the removable recording medium 501 include a digital versatile disc (DVD) medium, a Blu-ray (registered trademark) medium, a high-definition (HD) DVD medium, various types of semiconductor storage media, and so forth. The removable recording medium 501 may also be, for example, an integrated circuit (IC) card with a contactless IC chip embedded therein, electronic equipment, or the like, as a matter of course.

The connection port 210 is a port for connecting externa connected equipment 502, such as a Universal Serial Bus (USB) port, an IEEE 1394 port, a High-Definition Multimedia Interface (HDMI) port, a Small Computer System Interface (SCSI) port, and RS-232C port, an optical audio terminal, or the like, for example. The externally-connected equipment 502 is, for example, a printer, a portable music player, a digital camera, a digital video camera, an IC recorder, or the like.

The communication unit 211 is a communication device for connecting to a network 503, and is a communication card for wired or wireless local area network (LAN), Bluetooth (registered trademark), or wireless USB (WUSB), a router for optical communication, a router for asymmetric digital subscriber line (ADSL), modems for various types of communication or the like, for example.

Note that the configuration of the cloud server 300 is the same as the configuration of the PC 200, and accordingly description of a configuration example thereof will be omitted.

Processing at PC and Cloud Server

Figure 5:
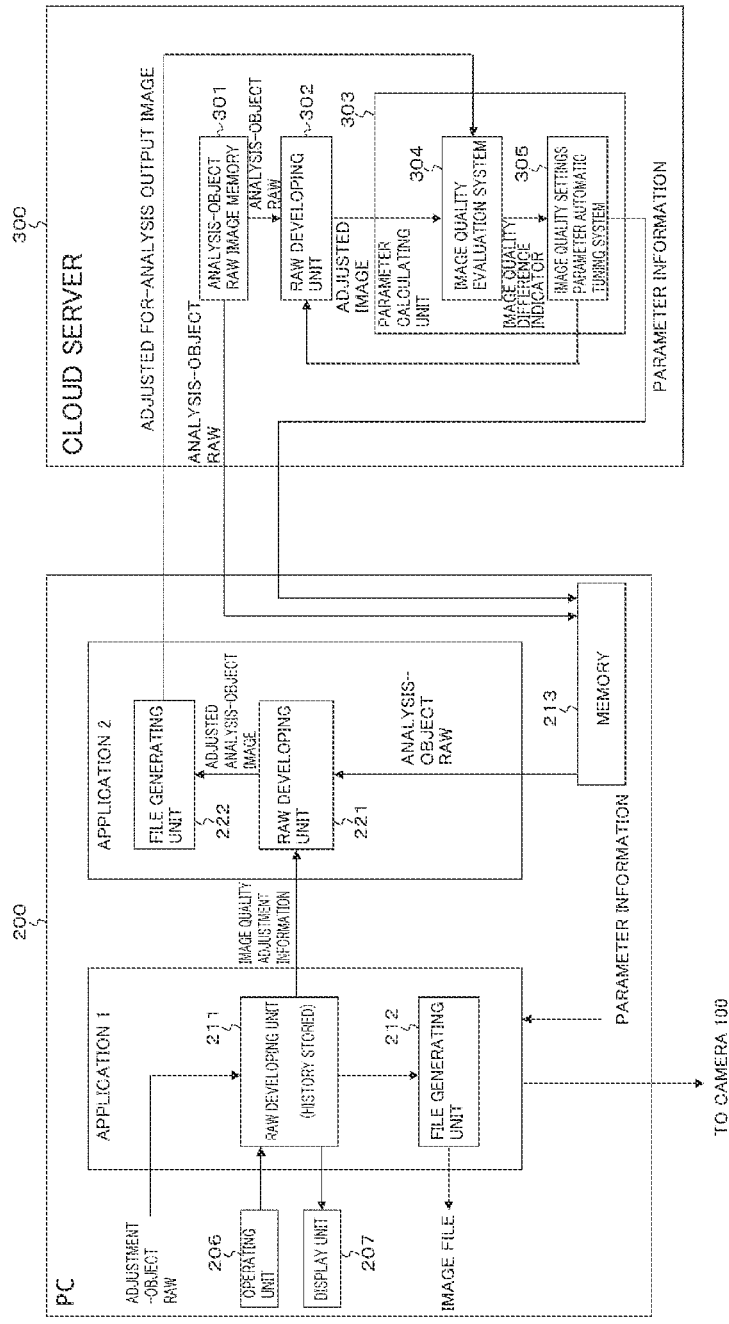
FIG. 5 is a diagram illustrating an example of a functional block diagram of the PC and the cloud server.

FIG. 5 is a diagram illustrating an example of a functional block diagram of the PC 200 and the cloud server 300. Processing performed at the PC 200 and the cloud server 300 will be described further with reference to this functional block diagram.

The application 1 of the PC 200 has a RAW developing unit 211 and a file generating unit 212. The RAW developing unit 211 performs developing processing on the adjustment-object RAW image that is RAW image acquired by photographing a subject, and obtains an output image. This adjustment-object RAW image is obtained by reading out from the removable recording medium 501 (see FIG. 4), for example.

Image quality adjustment is performed on the basis of image quality adjustment operations by the user with regard to this developing processing, and developing is performed so as to obtain image quality according to user preferences. The user performs operations such as, for example, color adjustment, brightness adjustment, tone adjustment, sharpness adjustment, noise adjustment, and so forth.

An output image obtained by performing the developing processing is displayed on the display unit 207. The image quality of this output image changes in accordance with the image quality adjustment operations performed by the user. Accordingly, the user can perform image quality adjustment to obtain preferred image quality while referencing the output image displayed on the display unit 207. A user interface (UI) display for image quality adjustment operations by the user is further performed on the display unit 207. The user can easily and appropriately perform image quality adjustment operations on the basis of this UI display.

Now, history of image quality adjustment is stored. This history of image quality adjustment includes information of which adjustment items have been adjusted in which order, and by how much. The reason why the history of image quality adjustment is stored, and not the final adjustment values of the adjustment items, is to completely reproduce the image quality adjustment of the application 1 at the application 2 by using this history of image quality adjustment as image quality adjustment information. This takes into consideration possible differences in adjustment results depending on the order of adjusting the adjustment items.

Note that in the image quality adjustment operations by the user, a scenario is conceivable in which image quality adjustment operations are performed starting from certain adjustment results (fine-adjustment operations of image quality), and final adjustment results are obtained. In this case, with regard to the certain adjustment results, the history of image quality adjustment performed at the time of obtaining the results and the adjustment-object RAW image are saved in a correlated manner. In a case of the user performing adjustment operations starting from certain adjustment results, image quality adjustment is performed as to the saved adjustment-object RAW image on the basis or the saved image quality adjustment history, thereby reproducing the certain adjustment results, and thus the user can perform image quality adjustment from this state and obtain adjustment results. In this case, the history of the new image quality adjustment is added to the saved image quality adjustment history, and thus becomes the latest image quality adjustment history.

The file generating unit 212 generates an image file (JPG file) on the basis of the YC signals output from the RAW developing unit 211. This image file is recorded in the removable recording medium 501 by the drive 209 and is reproduced and used for image display, for example, or transmitted to an external device, as appropriate.

The application 1 notifies the application 2 of image quality adjustment information in accordance with operations of pressing the "REFLECT IN CAMERA" button displayed on the display unit 207 (see FIG. 4) of the PC 200. This adjustment information includes the above-described image quality adjustment history. Note that an arrangement is conceivable in which the final adjustment values of each adjustment item are included in the image quality adjustment information, instead of the image quality adjustment history.

The application 2 of the PC 200 has a RAW developing unit 221 and a file generating unit 222. The RAW developing unit 221 has the same configuration as the RAW developing unit 221 of the application 1. The RAW developing unit 221 performs developing processing on an analysis-object RAW image (a RAW image suitable for analysis), and obtains an adjusted analysis-object image as an output image. This RAW developing unit 221 makes up an analysis-object image quality adjusting unit.

An analysis-object RAW image is obtained by reading out from memory 213. This memory 213 is configured of the RAM 203 (see FIG. 4), for example. The application 2 (PC 200) acquires an analysis-object RAW image to be used from analysis-object RAW image memory 301 of the cloud server 300, and stores in the memory 213.

Now, for the analysis-object RAW image used by the application 2, using an analysis-object RAW image that matches the photography conditions (including camera model and so forth, in addition to ISO speed, aperture, and shutter speed) of the adjustment-object RAW image used by the application 1 enables the precision of image quality settings parameters decided by the cloud server 300 to be improved. In particular, matching the ISO speed enables feel of noise to be matched in the completed image.

Accordingly, in the application 2, the RAW developing unit 221 that makes up the analysis-object image quality adjusting unit selects an analysis-object RAW image to be used from a plurality of analysis-object RAW candidate images that are candidates for analysis-object RAW images stored in the analysis-object RAW image memory 301 of the cloud server 301, on the basis of photography conditions information indicating photography conditions of the adjustment-object RAW image. In this case, for example, photography conditions information is attached to the adjustment-object RAW image, and photography conditions information is also attached to the plurality of analysis-object RAW images stored in the analysis-object RAW image memory 301.

In this case, cases are assumed in which an analysis-object RAW image that completely matches the photography conditions of the adjustment-object RAW image used by the application 1 is not available to be used as the analysis-object RAW image used by the application 2.

A case in which the ISO sensitivity does not match will be described. An example will be assumed in which a user applies strong noise reduction to a noisy adjustment-object RAW image photographed at high-sensitivity ISO 50000, to finish as a preferred image. Applying the same noise reduction to an analysis-object RAW image photographed at low-sensitivity ISO 100 will yield an image with a markedly deteriorated feel of resolution.

This case can be solved by an option in which the user can select which adjustment items are to be reflected. Recommendations can be made to the user not to reflect feel of resolution that changes primarily according to ISO sensitivity, sharpness adjustment corresponding to feel of noise, and noise adjustment. Meanwhile, in this case, color adjustment, brightness adjustment, contrast adjustment, and various types of effects, which affect the overall impression of the image, are reflected.

Also, a case will be described in which there is no photography conditions information attached to one or both of the adjustment-object RAW image and the analysis-object RAW image, and the features are unknown. There is the same concern in the case as the case described above in which the ISO sensitivity does not match. Accordingly, this can be solved by an option in which the user can select which adjustment items are to be reflected. Recommendations can be made to the user not to reflect feel of resolution that changes primarily according to the features of the adjustment-object RAW image, sharpness adjustment corresponding to feel of noise, and noise adjustment. Meanwhile, in this case, color adjustment, brightness adjustment, contrast adjustment, and various types of effects, which affect the overall impression of the image, are reflected.

The file generating unit 222 generates an image file (JPG file) on the basis of the adjusted analysis-object image (YC signals) output from the RAW developing unit 221. The application 2 transmits this image file to the cloud server 300, for calculation (decision) of image quality settings parameters of captured images obtained at the camera 100. Note that in this case, transmission in the state of YC signals, instead of a JPG file, is conceivable.

The cloud server 300 has, in addition to the analysis-object RAW image memory 301, a RAW developing unit 302 and a parameter calculating unit 303. The parameter calculating unit 303 has an image quality evaluation system 304 and an image quality settings parameter automatic tuning system 305.

The RAW developing unit 302 has the same configuration as that of the RAW developing unit 114 (see FIG. 3) of the camera 100. The RAW developing unit 302 acquires the same analysis-object RAW image as that used by the application 2 of the PC 200 from the analysis-object RAW image memory 301, performs developing processing, and obtains an adjusted image as an output image (YC signals).

The parameter calculating unit 303 calculates (decides) image quality settings parameters to be set to the RAW developing unit 302, on the basis of the adjusted image from the RAW developing unit 302 and the image file (JPG) file of the adjusted analysis object image sent from the application 2 of the PC 200. In this case, image quality settings parameters are calculated (decided) so that the difference between the image quality evaluation value of the adjusted image (first image quality evaluation value) and the image quality evaluation value of the adjusted analysis-object image (second image quality evaluation value) is no greater than a predetermined value.

The image quality evaluation system 304 performs image quality evaluation of the adjusted image and the adjusted analysis-object image, and obtains each of the first image quality evaluation value and the second image quality evaluation value. The image quality evaluation system 304 then calculates an image quality difference indicator that indicates the difference between the first image quality evaluation value and the second image quality evaluation value. The first image quality evaluation value and the second image quality evaluation value here are evaluation values evaluating at least one out of color reproducibility, contrast, feel of resolution, and feel of noise. Thus, image quality settings parameters can be decided so as to match at least one image quality out of color reproducibility, contrast, feel of resolution, and feel of noise.

The image quality settings parameter automatic tuning system 305 calculates tentative image quality settings parameters for the RAW developing unit 302 on the basis of the image quality difference indicator calculated by the image quality evaluation system 304 (e.g., calculated by structural similarity (SSIM)) using a nonlinear optimization algorithm such as a genetic algorithm (GA), simulated annealing (SA), or the like, so that the difference is small. The tentative image quality settings parameters found by the image quality settings parameter automatic tuning system 305 are reflected in the RAW developing unit 302.

The image quality settings parameter automatic tuning system 305 repeats finding tentative image quality settings parameters for the RAW developing unit 302 on the basis of new image quality difference indices, performs optimization, and calculates image quality settings parameters. In this case, in a case in which the image quality difference indicator exceeds a threshold value, for example, the tentative image quality settings parameter is saved as an image quality settings parameter. While manually performing calibration of image quality settings parameters requires a great number of man-hours, image quality settings parameters can be suitably calculated (decided) without human intervention by using this system.

The cloud server 300 transmits parameter information, which is information of the image quality settings parameters calculated (decided) by the image quality settings parameter automatic tuning system 305, to the PC 200. The PC 200 loads the parameter information to the memory 213, and thereafter performs transmission thereof to the camera 100 via the application 1. Note that the parameter calculating unit 303 of the cloud server 300 is not limited to being configured of the image quality evaluation system 304 and the image quality settings parameter automatic tuning system 305 as described above.

Display Example on PC

Figure 6:
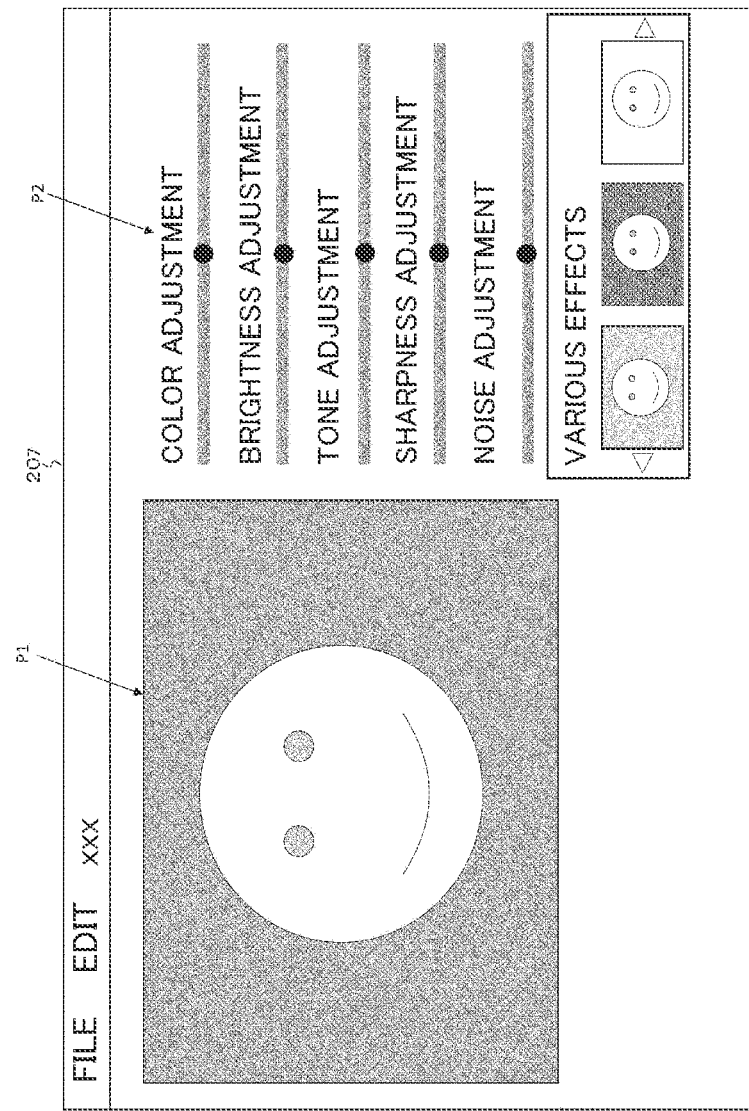
FIG. 6 is a diagram illustrating an example of a user interface (UI) display of the PC relating to image quality adjustment operations by a user.

FIG. 6 illustrates an example of a display on the display unit 207 (see FIG. 4) of the PC 200. An arrow P1 indicates a display region of an output image. An arrow P2 indicates a UI display region for image quality adjustment operations. In this example, the user is capable of performing operations of color adjustment, brightness adjustment, tone adjustment, sharpness adjustment, and noise adjustment, and also is capable of selection operations of various types of effects, on the basis of the UI display.

Figure 7:
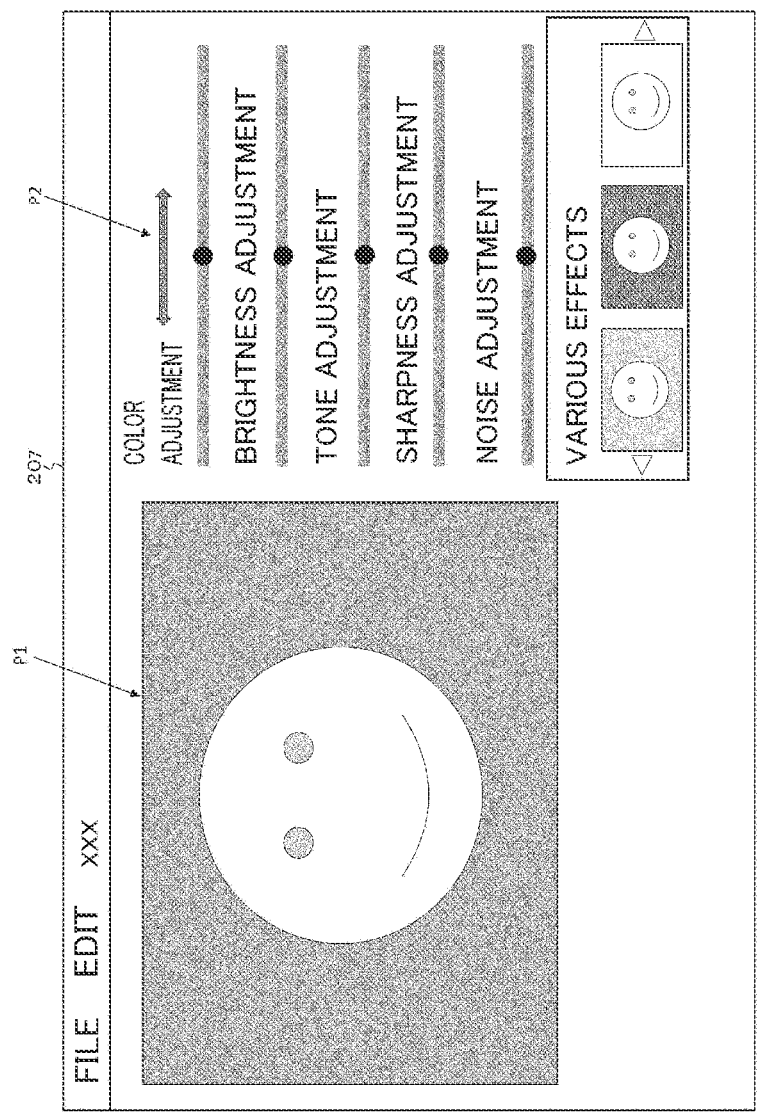
FIG. 7 is a diagram illustrating an example of the UI display of the PC relating to image quality adjustment operations by the user.
Figure 8:
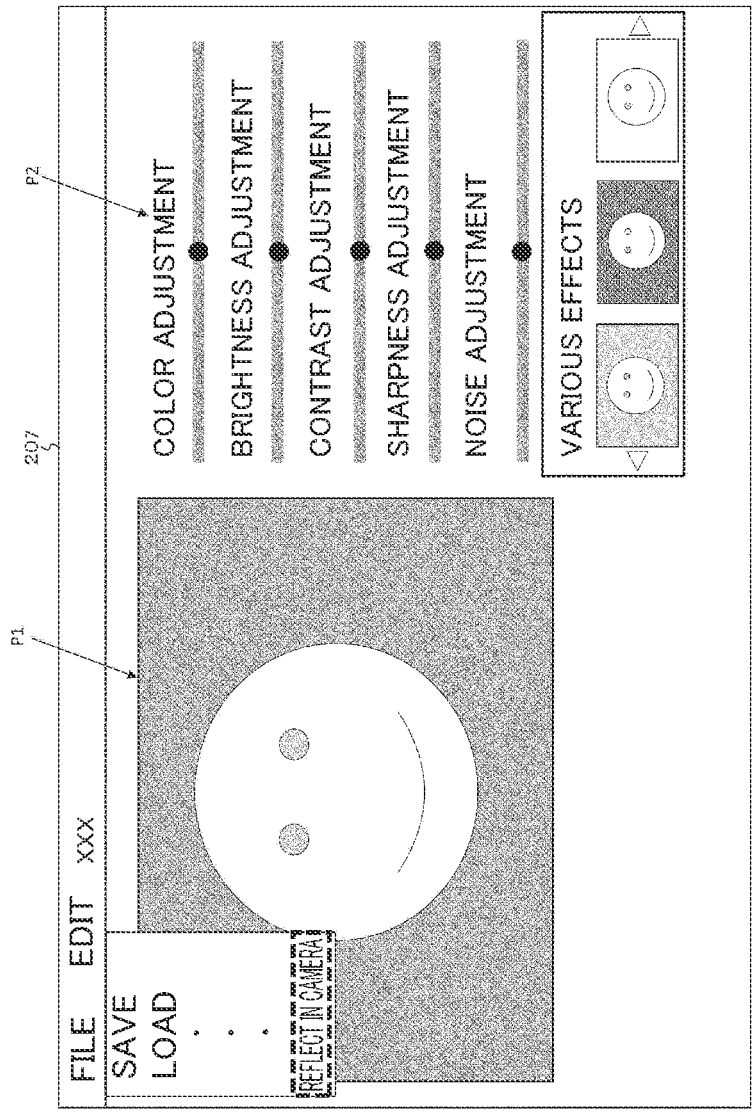
FIG. 8 is a diagram illustrating an example of the UI display of the PC relating to image quality adjustment operations by the user.
Figure 9:
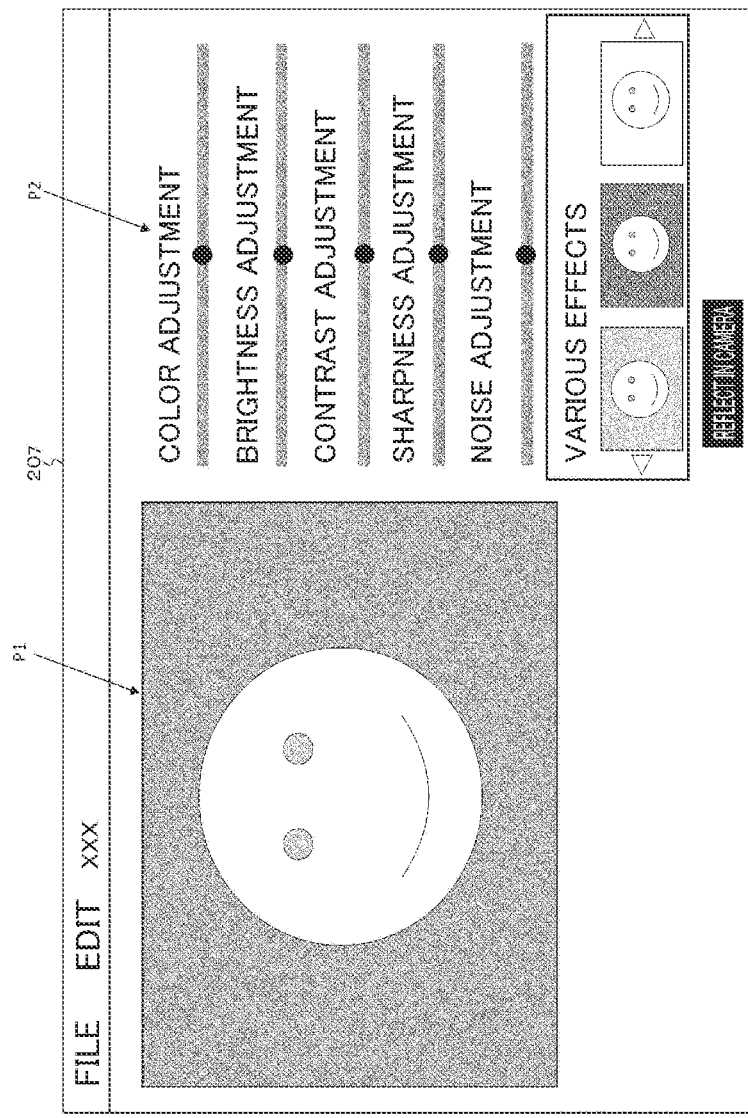
FIG. 9 is a diagram illustrating an example of the UI display of the PC relating to image quality adjustment operations by the user.

The user can adjust the parameters in the UI display region P1 for image quality adjustment operations, as illustrated in FIG. 7, and finish the image quality of the output image to a desired image quality. When the image quality of the output image becomes an image quality according to preference as a result of the image quality adjustment operations, and the user desires to reflect this image quality in the camera 100, the user selects "REFLECT IN CAMERA" from a "FILE" pulldown menu, as illustrated in FIG. 8. Accordingly, a "REFLECT IN CAMERA" button for reflecting the parameters in the camera 100 comes up on the display unit 207 as illustrated in FIG. 9.

Figure 10:
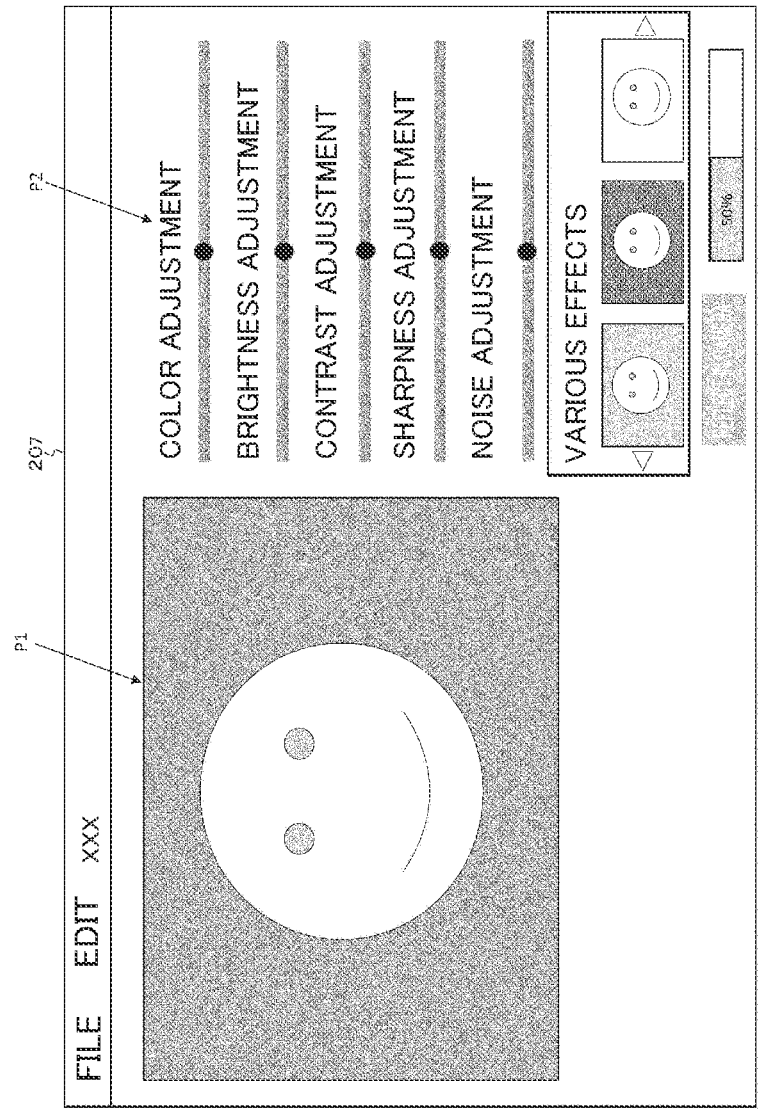
FIG. 10 is a diagram illustrating an example of the UI display of the PC relating to image quality adjustment operations by the user.

By the user performing a pressing operation on the "REFLECT IN CAMERA" button, the processing transitions to the processing of the application 2 at the PC 200, and further to the processing of calculating image quality settings parameters at the cloud server 300, as described above. In this case, a progress bar indicating the degree of progress until calculation of the image quality settings parameters is completed at the cloud server 300 is displayed, as illustrated in FIG. 10. This progress bar lets the user know the state of progress of the processing.

Figure 11:
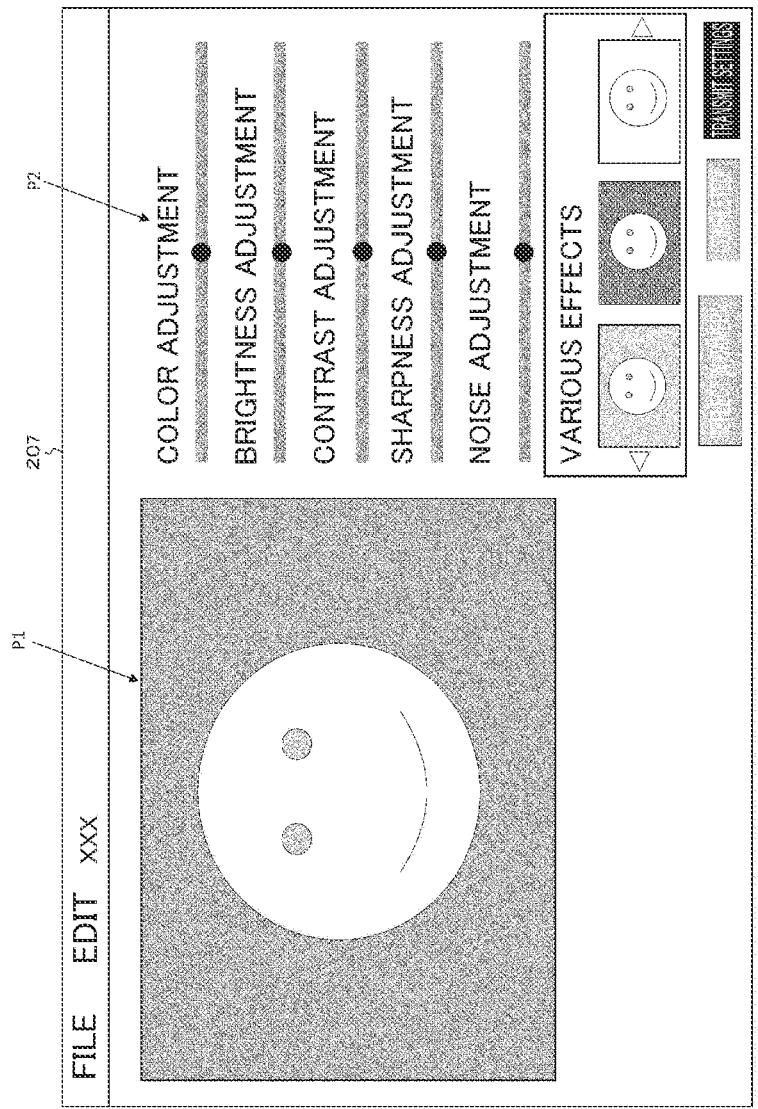
FIG. 11 is a diagram illustrating an example of the UI display of the PC relating to image quality adjustment operations by the user.

When calculation of the image quality settings parameters at the cloud server 300 is complete, the display in the progress bar portion changes to "COMPLETED!!" on the display unit 207, and a "TRANSMIT SETTINGS" button for transmitting and setting the image quality settings parameters calculated at the cloud server 300 to the camera 100 comes up, as illustrated in FIG. 11. Note that when the display in the progress bar portion changes to "COMPLETED!!", the image quality settings parameters calculated at the cloud server 300 are in a state of having been transmitted from the cloud server 300 to the PC 200 and loaded to the memory 213, for example.

Note that at the time of the user setting the image quality settings parameters in the RAW developing unit 114 of the camera 100, one set of settings can be selected from a plurality of sets of settings and set. In a case of transmitting the image quality settings parameters calculated at the cloud server 300 from the PC 200 to the camera 100 as described above, a selection operation is performed in advance at the camera 100 by user operations, regarding which settings to save the image quality settings parameters sent from the PC 200 as.

Figure 12:
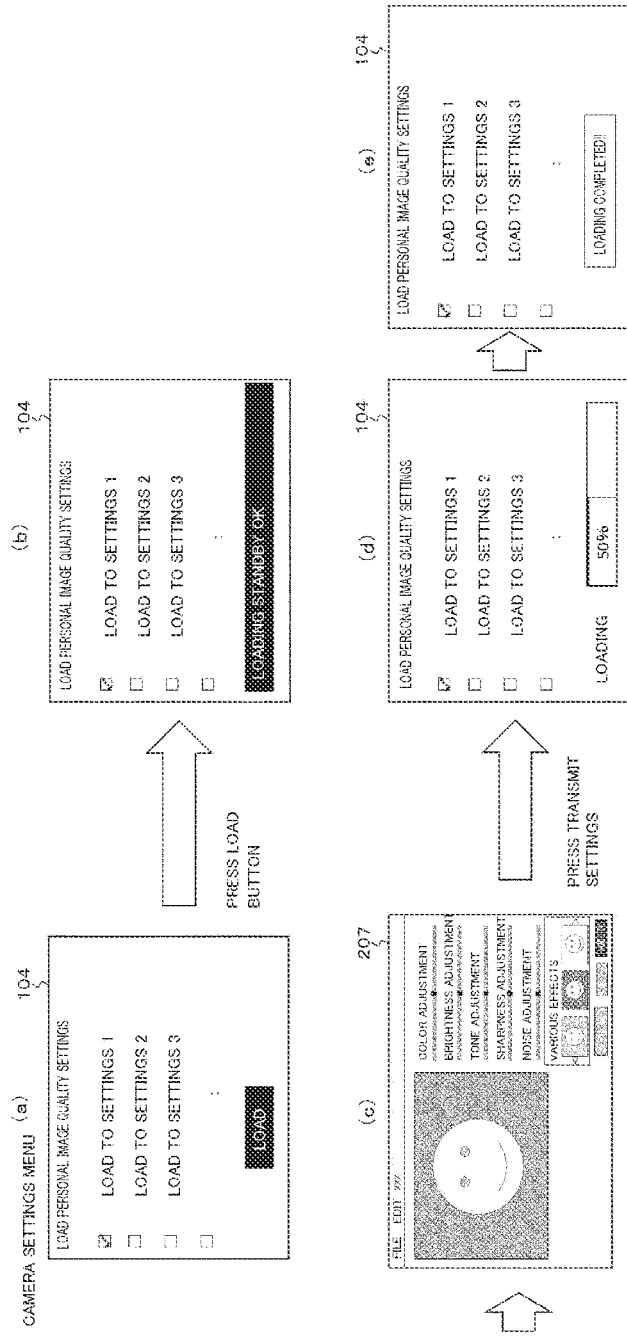
FIGS. 12A to 12E are diagrams for describing loading of image quality settings parameters to the camera.

FIG. 12A illustrates an example of a camera settings menu displayed on the display unit 104 of the camera 100 at this time. The user checks which of the settings to load the image quality settings parameters to, in this camera settings menu. In the example illustrated in FIG. 12A, a state in which a checkbox for "LOAD TO SETTINGS 1" is checked is shown. When the user performs a pressing operation of a "LOAD" button following having checked which settings to load the image quality settings parameters to in this way, a display of "LOADING STANDBY OK" comes up in the camera settings menu, as shown in FIG. 12B.

When the user performs a pressing operation of a "TRANSMIT SETTINGS" button displayed on the display unit 207 of the PC 200 as illustrated in FIG. 12C in the "LOADING STANDBY OK" state of the camera 100 in this way, loading of the image quality settings parameters from the PC 200 to the camera 100 starts. A progress bar is displayed in the camera settings menu at this time, as illustrated in FIG. 12D. The user can know the state of progress of loading from this progress bar. When loading is completed, a display of "LOADING COMPLETED!!" comes up in the camera settings menu, and thus the user can know that loading of the image quality settings parameters from the PC 200 to the camera 100 has been completed, as illustrated in FIG. 12E.

Note that an example has been described above in which, when "REFLECT IN CAMERA" is selected from the "FILE" pulldown menu (see FIG. 8) on the display unit 207 of the PC 200, only the "REFLECT IN CAMERA" button is displayed on the display unit 207 of the PC 200, as illustrated in FIG. 9.

Figure 13:
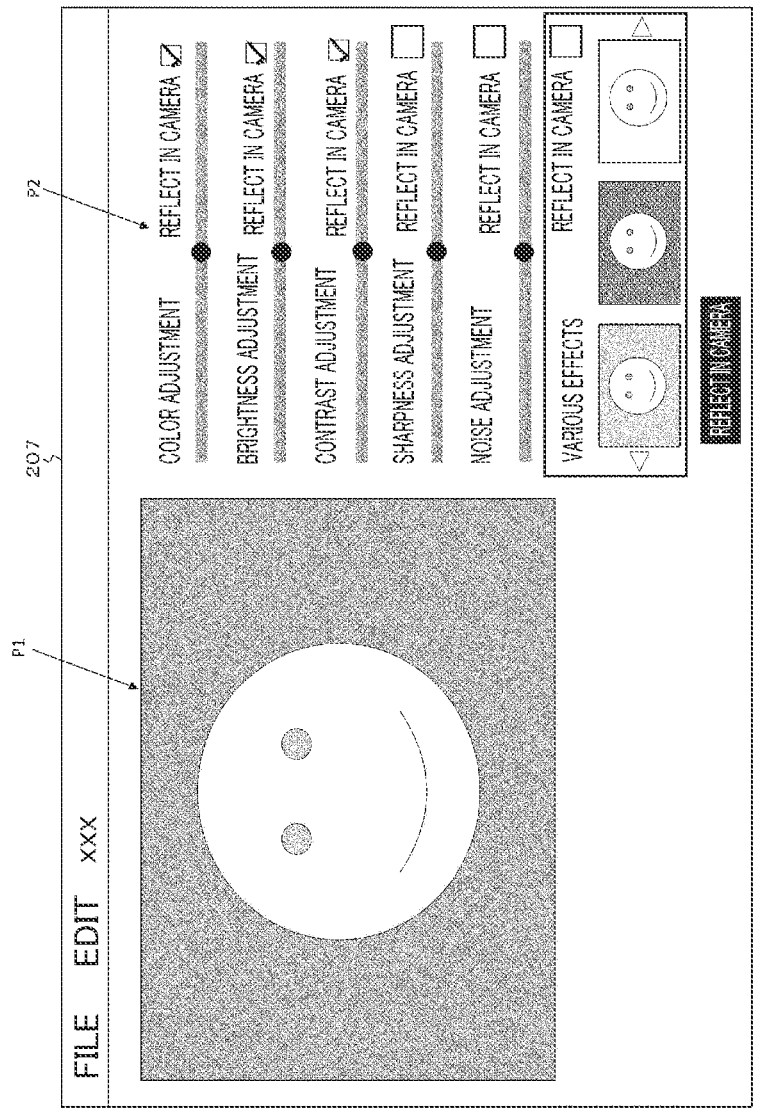
FIG. 13 is a diagram illustrating an example of the UI display on the PC relating to image quality adjustment operations by the user.

However, an arrangement is conceivable in which checkboxes are further displayed to enable the user to select, out of the plurality of image quality adjustment items operated by the user with regard to the RAW developing by the application 1, image quality adjustment items to be reflected in the application 2, as illustrated in FIG. 13. In the example in FIG. 13, a state in which the checkboxes for "COLOR ADJUSTMENT", "BRIGHTNESS ADJUSTMENT", and "CONTRAST ADJUSTMENT" are checked is illustrated. Accordingly, the user can optionally select image quality adjustment items to be reflected in the application 2, and the image quality corresponding to the image quality adjustment items selected by the user can be reflected in the camera 100.

Also, in a case in which the user can select image quality adjustment items to be reflected in the application 2 in this way, the RAW developing unit 221 making up the analysis-object image quality adjusting unit may be arranged to select an analysis-object RAW image to be used by the application 2 in accordance with the image quality adjustment items selected by the user, and to cause the cloud server 300 to calculate (decide) image quality settings parameters for reflecting image quality corresponding to the image quality adjustment items selected by the user in the camera 100 in a precise manner. For example, in a case in which the image quality corresponding to the image quality adjustment item selected by the user is color reproducibility, the analysis-object RAW image to be used by the application 2 contains an image region by which color reproducibility can be evaluated with good precision.

As described above, in the information processing system 10 illustrated in FIG. 1, the application 2 of the PC 200 generates adjusted analysis-object images used along with analysis-object RAW images for deciding image quality settings parameters for captured images acquired at the camera 100, by performing image quality adjustment processing as to analysis-object RAW images on the basis of image quality adjustment information indicating image quality adjustment values of image quality adjustment processing performed as to adjustment-object RAW images. Accordingly, image quality settings parameters can be decided for captured images using analysis-object RAW images and adjusted analysis-object images that are suitable for analysis, and image quality according to user preferences can be reflected in the camera 100 with better precision.

Figure 14:
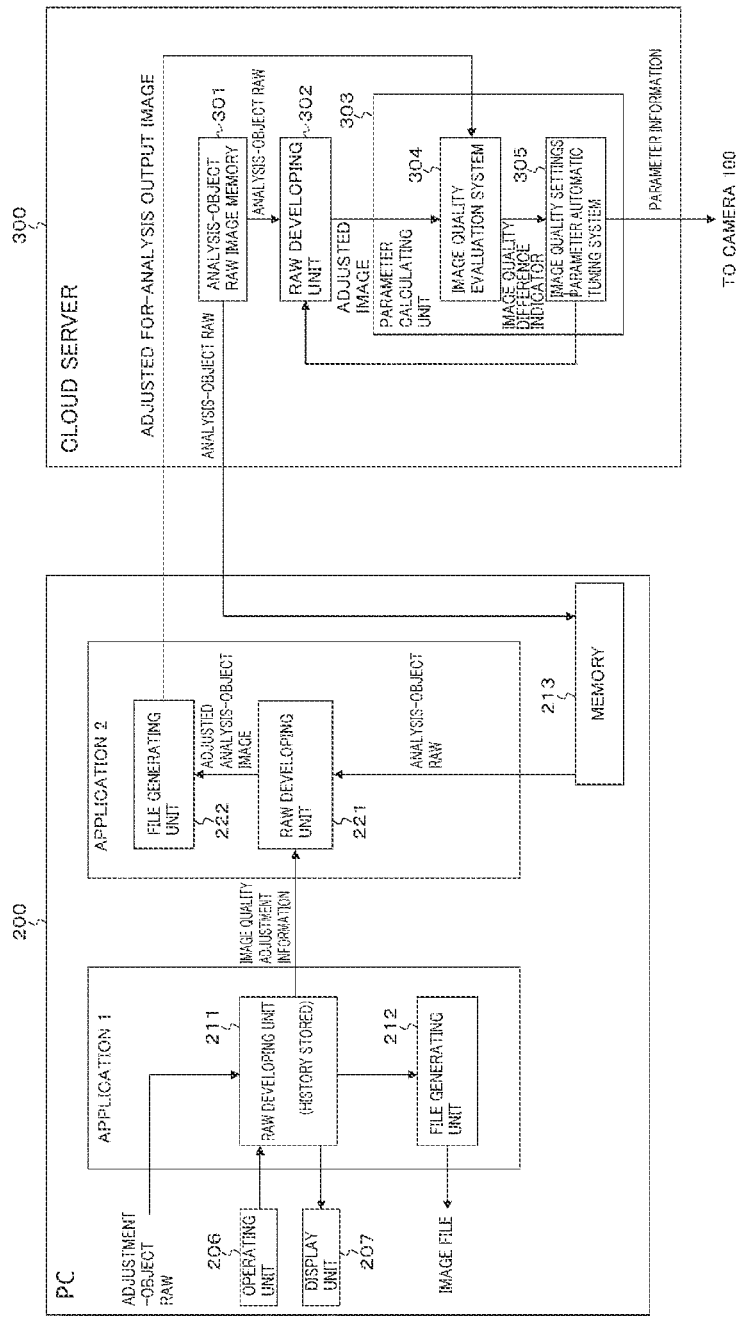
FIG. 14 is a diagram illustrating another example of a functional block diagram of the PC and the cloud server.

Note that an example is illustrated in the functional block diagram of the PC 200 and the cloud server 300 illustrated in FIG. 5 in which the image quality settings parameters calculated by the cloud server 300 are transmitted to the camera 200 via the PC 200. However, an arrangement is conceivable in which the image quality settings parameters calculated by the cloud server 300 are directly transmitted to the camera 100 via the network 400. FIG. 14 illustrates an example of a functional block diagram of the PC 200 and the cloud server 300 in this case. In FIG. 14, portions that correspond to FIG. 5 are denoted by the same signs, and detailed description thereof will be omitted.

Also, in the above-described arrangement, processing of subjecting the analysis-object RAW image to developing processing on the basis of the image quality adjustment information obtained by the application 1, and generating an adjusted analysis-object image, is performed by the application 2 in the PC 200. However, an arrangement is conceivable in which the processing of the application 2 is performed by the application 1 as well. In this case, the processing of the application 1 and the processing of the application 2 can be carried out by a single application (program).

In this case, for example, the application 2 is embedded in the application 1, and at the timing of the user performing the operation of pressing the "REFLECT IN CAMERA" button, an adjusted analysis-object image obtained by sub-jecting the analysis-object RAW image to developing processing is transmitted to the cloud server 300 and used for calculating the image quality settings parameters. Note that reflecting image quality adjustment items in the developing processing of the analysis-object RAW image may be performed in parallel with the reflecting of the image quality adjustment items in the developing processing of the adjustment-object RAW image until the pressing operation of the "REFLECT IN CAMERA" button is performed, or may all be reflected at once on the basis of adjustment history at the timing of the pressing operation of the "REFLECT IN CAMERA" button being performed.

Also, although not described above, the application 1 in the PC 200 functions as a normal RAW editing application unless there is a pressing operation of the "REFLECT IN CAMERA" button. Display or non-display of the "REFLECT IN CAMERA" button may be switchable.

Also, although not described above, the operation of pressing the "REFLECT IN CAMERA" button may be performed at each timing of reaching what can be considered to be a certain level of completion partway through editing. Many candidates with fine adjustments made mainly around adjustment items with a completion to a certain level of height can be created, and also completely different variations can also be created.

Also, although not described above, the analysis-object RAW image used by the application 2 may be updated as appropriate to facilitate calculation of the image quality settings parameters at the cloud server 300, such as when updating the application 1 and so forth.

Also, although the above-described arrangement is an arrangement in which user operations for image quality adjustment in developing processing by the application 1 are performed at the PC 200, relegating this portion to a professional or a developer/designer is conceivable, Also, a configuration is conceivable in which the processing of the application 1 is performed at an external device, and image quality adjustment information is supplied from the external device to the PC 200.

Also, in the above-described arrangement, image quality settings parameters generated at the cloud server 300 are loaded to the camera 100 as settings selected in advance each time the operation of pressing the "REFLECT IN CAMERA" button is performed at the PC 200 (see FIGS. 12A to 12E).

Figure 15:
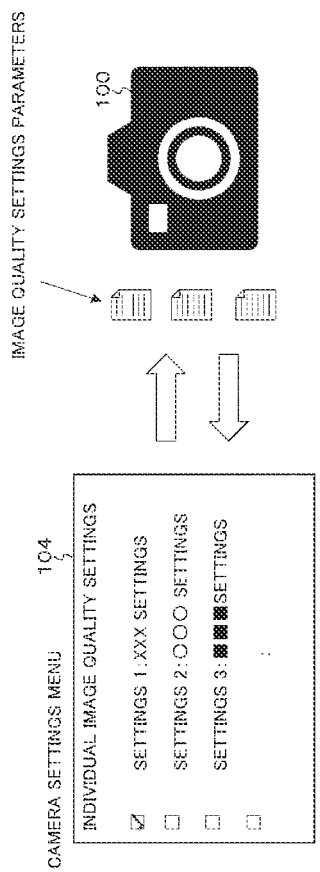
FIG. 15 is a diagram for describing an example of storing a plurality of image quality settings parameters.

Accordingly, the camera 100 can be in a state of holding image quality settings parameters for a plurality of sets of settings in the memory 102, as illustrated in FIG. 15. The user selects desired image quality settings parameters from the camera settings menu displayed on the display unit 104 of the camera 100 in this state, to be set to the RAW developing unit 104 and used. In the example in FIG. 15, a state in which "SETTINGS 1: XXX SETTINGS" are selected is illustrated. Note that in this case, the user can optionally name the settings in the camera settings menu.

Figure 16:
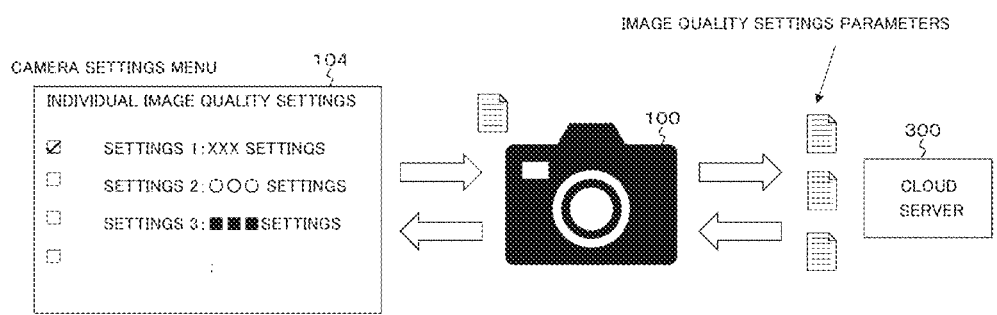
FIG. 16 is a diagram for describing another example of storing the plurality of image quality settings parameters.

In this case, a conceivable arrangement is to, instead of holding a plurality of sets of image quality settings parameters in the memory 102, hold the image quality settings parameters in the cloud server 300, and load the image quality settings parameters from the cloud server 300 to the camera 100 at a timing of the user selecting desired image quality settings parameters from the camera settings menu displayed on the display unit 104 of the camera 100, to be set to the RAW developing unit 104 and used, as illustrated in FIG. 16. Holding the image quality settings parameters in the cloud server 300 in this way enables the memory capacity used in the memory 102 of the camera 100 to be suppressed.

2. Modifications

No consideration is given to the type of image contents of the adjustment-object RAW image in the above-described embodiment. Processing that as optimal for each adjustment-object RAW image is not necessarily the same for the user every time, and it can be assumed that optimal processing will differ under various conditions. Changing conditions conceivably include (1) subject (people, scenery, night scenes, etc.), (2) expression of feelings (warm colors, cool colors, hard tones, soft tones, etc.), (3) nature of the image itself (feel of noise, feel of resolution, colorfulness, sparseness of colors, etc.).

In this case, an arrangement is conceivable in which calculation (decision) of image quality settings parameters is performed at the cloud server 300 for each image type information indicating the type of image contents of the adjustment-object RAW images, enabling image quality settings parameters to be set and used at the RAW developing unit 114 in accordance with the type of image contents of the image captured by the camera 100. Thus, image quality adjustment processing that differs for each type of image contents of the adjustment-object RAW images can be reflected in the camera 100. Including information indicating the type of subject in the image type information in this way enables image quality adjustment processing that differs for each type of subject to be reflected in the camera 100.

In this case, image quality adjustment processing that differs for each type of image contents of adjustment-object RAW images can be reflected in the camera 100 by correlating adjusted analysis-object images generated by the application 2 and image type information (meta-information) indicating the type of image contents of the adjustment-object RAW images.

In a case of performing calculation (decision) of image quality settings parameters for each image type information indicating the type of image contents of the adjustment-object RAW images, a solution can be conceived in which image quality settings parameters set to the RAW developing unit 114 of the camera 100 are changed in association with subject recognition functions that the camera 100 has.

Figure 17:
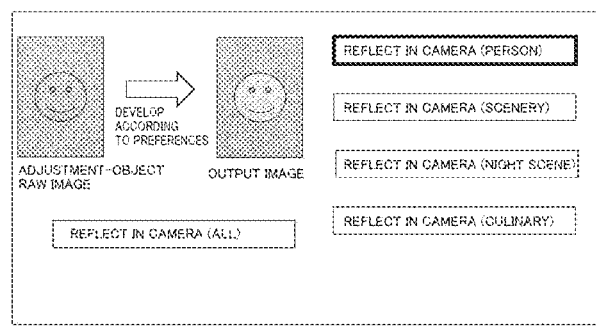
FIG. 17 is a diagram for describing a case of the user manually performing correlation between an adjustment-object RAW image and the type of subject.

First, a case of the user manually performing correlation between adjustment-object RAW images and types of subjects will be described. In this case, the user can select which subject type to be correlated with when operating the "REFLECT IN CAMERA" button at the PC 200 by performing an operation of pressing the corresponding button, as schematically illustrated in FIG. 17. The example in FIG. 17 shows a state in which a pressing operation of a "REFLECT IN CAMERA (PERSON)" button has been performed by the user, due to the type of subject being a person.

In this case, when image quality adjustment information is notified from the application 1 to the application 2, image type information (meta-information) indicating the type of subject is attached to this image quality adjustment information. When the analysis-object RAW image is subjected to RAW developing processing by the application 2, image quality adjustment processing is performed on the basis of the image quality adjustment information notified from the application 1, and an adjusted analysis-object image is generated. The above-described image type information (meta-information) indicating the type of subject is attached to this adjusted analysis-object image as well.

The adjusted analysis-object image with the image type information (meta-information) indicating the type of subject attached in this way is sent to the cloud server 300 from the application 2, and image quality settings parameters are generated for each type of subject at the cloud server 300. The image quality settings parameters generated at the cloud server 300 in this way are then transmitted to the camera 100 in a state with the image type information (meta-information) indicating the type of subject attached thereto, and is held for each type of subject.

Recognition processing of subjects is performed at the camera 100, and the image quality settings parameters corresponding to the recognized subject are read out, and set and used at the RAW developing unit 114. Accordingly, image quality adjustment processing corresponding to the type of subject can be reflected in the camera 100.

Figure 18:
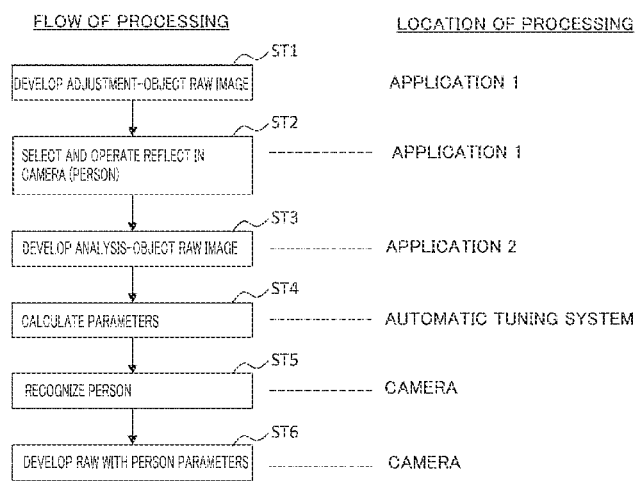
FIG. 18 is a flowchart schematically showing an example of processing in a case of the user manually performing correlation between an adjustment-object RAW image and the type of subject (person)

The flowchart in FIG. 18 schematically shows the flow of processing in a case of the user manually performing correlation of an adjustment-object RAW image and the type of subject (person), for example.

In step ST1, at the application 1, an adjustment-object RAW image is subjected to RAW developing processing. At this time, image quality adjustment is performed by user operations. Next, in step ST2, at the application 1, the user judges that the type of subject is a person, and performs an operation of selecting and pressing the "REFLECT TN CAMERA (PERSON)" button.

Next, in step ST3, at the application 2, the analysis-object RAW image is subjected to RAW developing processing on the basis of the image quality adjustment information notified from the application 1. Accordingly, an adjusted analysis-object image corresponding to the subject (person) is generated. Next, in step ST4, the image quality settings parameter automatic tuning system calculates (decides) image quality settings parameters corresponding to the subject (person). These image quality settings parameters are sent to the camera 100 and held.

Next, in step ST5, the camera 100 recognizes the subject as being a person. Next, in step S16, the camera 100 sets image quality settings parameters corresponding to the subject (person) to the RAW developing unit 114, and performs RAW developing using these image quality settings parameters, thereby obtaining a captured image.

Next, a case of automatically performing correlation between the adjustment-object RAW image and the type of subject will be described. In this case, identification of the type of subject is performed on the basis of image type information (meta-information) attached to the adjustment-object RAW image, or by recognition processing information of the type of subject performed with regard to the adjustment-object RAW image by the application 1.

Figure 19:
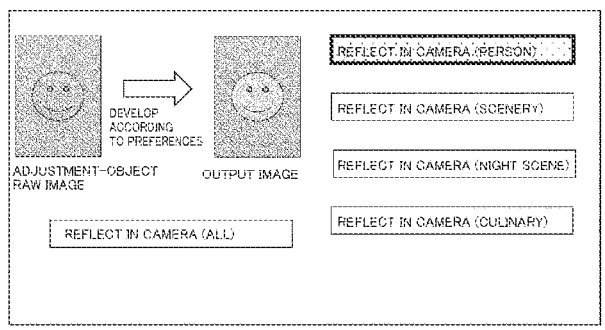
FIG. 19 is a diagram for describing a case of automatically performing correlation between an adjustment-object RAW image and the type of subject.

In this case, the button of the corresponding "REFLECT IN CAMERA" is explicitly in a different state from the others, on the basis of the identification results of the type of subject, as schematically illustrated in FIG. 19. The example in FIG. 19 illustrates a state in which the type of subject has been automatically recognized to be a person. Note that in this case, an arrangement may be made in which only the button for "REFLECT IN CAMERA" that corresponds to the automatically-identified type of subject is displayed.

At the time of performing operations of reflecting in the camera at the PC 200, the user performs a pressing operation of the button for "REFLECT IN CAMERA" that corresponds to the automatically-identified type of subject. The subsequent operations are the same as in the case in which the user manually performs correlation of an adjustment-object RAW image and the type of subject, described above.

Figure 20:
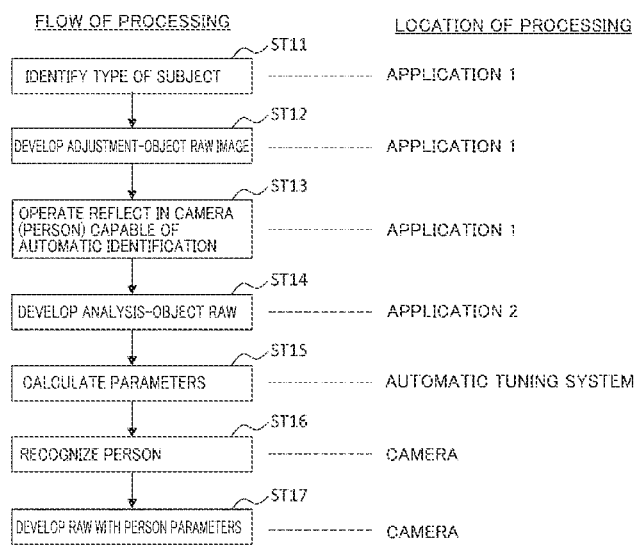
FIG. 20 is a flowchart schematically showing an example of processing in a case of automatically performing correlation between an adjustment-object RAW image and the type of subject (person)

The flowchart in FIG. 20 schematically shows the flow of processing in a case of automatically performing correlation with an adjustment-object RAW image and the type of subject (person), for example.

In step ST11, at the application 1, the type of subject is identified. Next, in step ST12, at the application 1, the adjustment-object RAW image is subjected to RAW developing processing. At this time, image quality adjustment is performed by user operations. Next, in step ST3, at the application 1, the user performs an operation of pressing the "REFLECT IN CAMERA (PERSON)" button corresponding to the automatic identification.

Next, in step ST14, at the application 2, the analysis-object RAW image is subjected to RAW developing processing on the basis of the image quality adjustment information notified from the application 1. Accordingly, an adjusted analysis-object image corresponding to the subject (person) is generated. Next, in step ST15, the image quality settings parameter automatic tuning system calculates (decides) image quality settings parameters corresponding to the subject (person). These image quality settings parameters are sent to the camera 100 and are held.

Next, in step ST16, the camera 100 recognizes the subject as being a person. Next, in step ST17, the camera 100 sets image quality settings parameters corresponding to the subject (person) to the RAW developing unit 114, and performs RAW developing using these image quality settings parameters, thereby obtaining a captured image.

In the above description, an example has been shown in which the camera 100 can hold image quality settings parameters in accordance with the type of subject, but an arrangement can be conceived in which the camera 100 holds image quality settings parameters corresponding to an even greater number of types of image contents.

Figure 21:
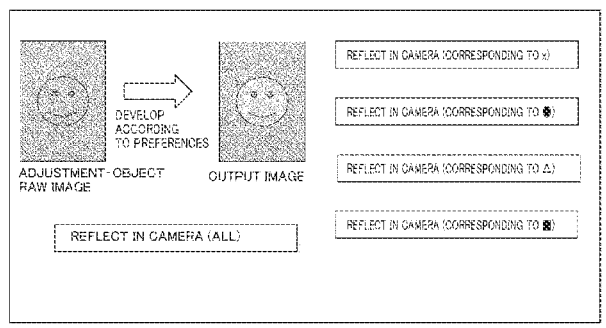
FIG. 21 is a diagram for describing a case in which the camera is imparted with image quality settings parameters corresponding to many image content types.

In this case, when performing operations of reflecting in the camera at the PC 200, the user presses the "REFLECT IN CAMERA" button regarding which is defined the type of image contents to be correlated, as schematically illustrated in FIG. 21. In this case, the user can define the types of image content for the buttons, and can also change the definitions as appropriate. The types of image contents here may include, besides the above-described subject, expressions of feelings, nature of the image itself, and so forth.

When an operation of pressing a predetermined "REFLECT IN CAMERA" button regarding which the type of image contents is defined is performed, and the image quality adjustment information is notified from the application 1 to the application 2, image type information (meta-information) indicating the type of image contents is attached to this image quality adjustment information. When the analysis-object RAW image is subjected to RAW developing processing at the application 2, image quality adjustment processing is performed on the basis of the image quality adjustment information notified from the application 1, and an adjusted analysis-object image is generated. The image type information (meta-information) indicating the type of image contents described above is attached to this adjusted analysis-object image as well.

The adjusted analysis-object image to which the image type information (meta-information) indicating the type of image contents is attached in this way is sent from the application 2 to the cloud server 300, and the cloud server 300 generates image quality settings parameters for each type of image contents. The image quality settings parameters generated by the cloud server 300 in this way is transmitted to the camera 100 in the state of the image type information (meta-information) indicating the type of image contents attached thereto, and is held for each type of image contents.

At the camera 100, the user selects image quality settings parameters of the type of image contents that the user desires to use, from the image quality settings parameters corresponding to the types of the plurality of image contents, and sets to the RAW developing unit 114. In the camera 100, accordingly, RAW developing can be performed on the basis of the image quality settings parameters that the user desires, and thereby obtain a captured image.

Figure 22:
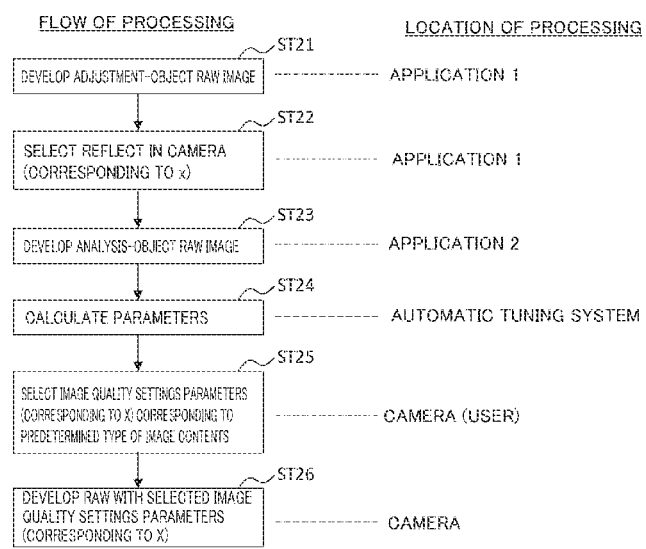
FIG. 22 is a flowchart schematically showing an example of processing in a case in which the camera is imparted with image quality settings parameters corresponding to many image content types and used.

The flowchart in FIG. 22 schematically illustrates the flow of processing in a case of the user selecting a predetermined type of image contents and uses the image quality settings parameters corresponding to the predetermined type of image contents in the camera 100, for example.

In step ST21, an adjustment-object RAW image is subjected to RAW developing processing. At this time, image quality adjustment is performed by user operations. Next, in step ST22, at the application 1, the user performs an operation of selecting and pressing the "REFLECT IN CAMERA" button regarding which is defined the predetermined type of image contents. In the example in FIG. 22, a case of selecting a "REFLECT IN CAMERA (CORRESPONDING TO X)" button is illustrated.

Next, in step ST23, at the application 2, the analysis-object RAW image is subjected to RAW developing processing on the basis of the image quality adjustment information notified from the application 1. Accordingly, an adjusted analysis-object image corresponding to the predetermined type of image contents is generated. Next, in step ST24, the image quality settings parameter automatic tuning system calculates (decides) image quality settings parameters corresponding to the predetermined type of image contents. These image quality settings parameters are sent to the camera 100 and are held.

Next, in step ST25, the user selects the image quality settings parameters corresponding to the predetermined type of image contents at the camera 100, and sets to the RAW developing unit 114. Next, in step ST26, the camera 100 performs RAW developing using these image quality settings parameters in accordance with the predetermined type of image contents, whereby a captured image can be obtained.

Also, in the above-described embodiment, an example in which the PC 200 has the application 1 and the application 2 is illustrated. However, an example in which the application 2 exists in the cloud server 300 is conceivable, as well.

Figure 23:
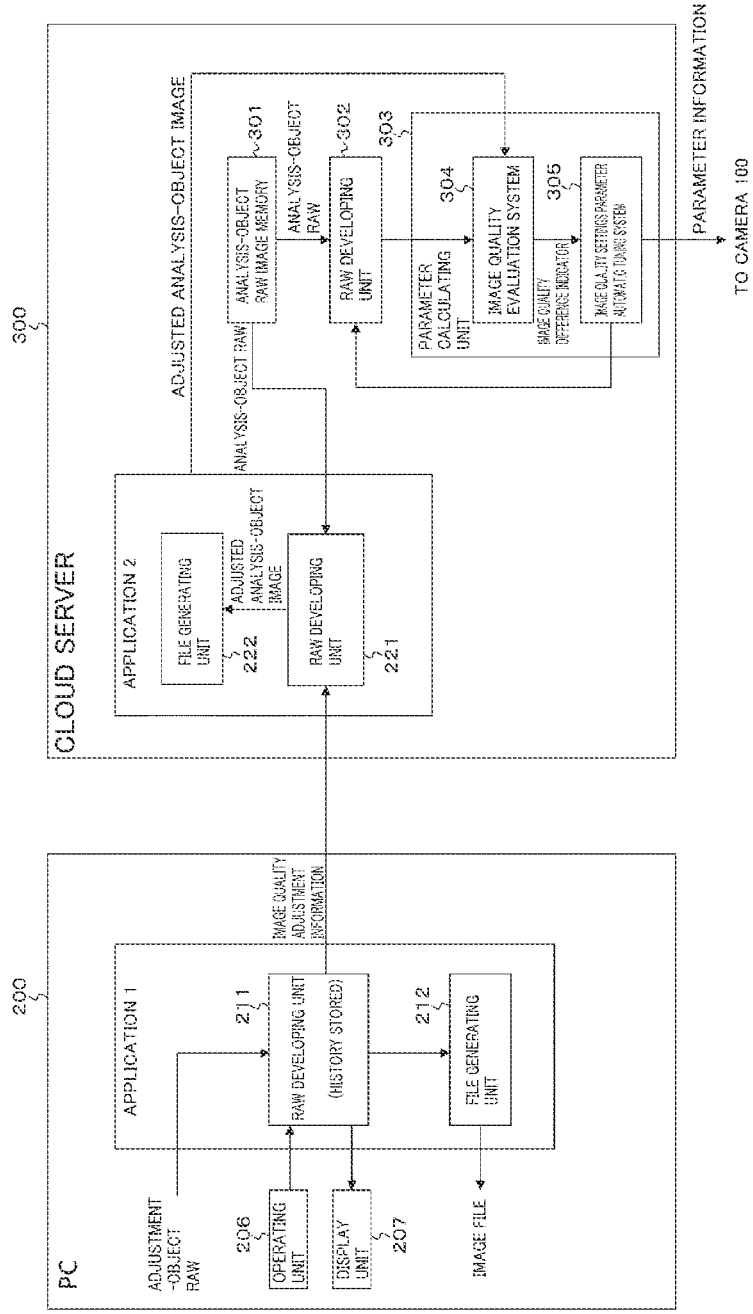
FIG. 23 is a diagram illustrating another example of the functional block diagram of the PC and the cloud server.

FIG. 23 illustrates an example of a functional block diagram of the PC 200 and the cloud server 300 in such a case. In FIG. 23, portions corresponding to FIGS. 5 and 14 are denoted by the same signs. In this example in FIG. 23, the configuration is the same as that of the example in FIG. 14 except for the application 2 having been moved from the PC 200 to the cloud server 300, and operations are carried out in the same manner. Accordingly, detailed description thereof will be omitted.

Note that while this example in FIG. 23 illustrates an example of directly transmitting the image quality settings parameters calculated at the cloud server 300 to the camera 100 via the network 400, an example is conceivable in which the image quality settings parameters calculated at the cloud server 300 are transmitted to the camera 200 via the PC 200, as in the example in FIG. 5.

Also, while in this example in FIG. 23, the configuration has an image quality settings parameter deciding unit (RAW developing unit, parameter calculating unit 303) that decides image quality settings parameters separately from the application 2, an arrangement is conceivable in which this image quality settings parameter deciding unit is included in the application 2. In this case, the processing of the application 2 and the processing of deciding image quality settings parameters can be processed with a single application (program).

Also, in the above-described embodiment, an example is illustrated in which the PC 200 has the application 1 and the application 2. However, an example is conceivable in which the application 1 and the application 2 exist in the cloud server 300.

Figure 24:
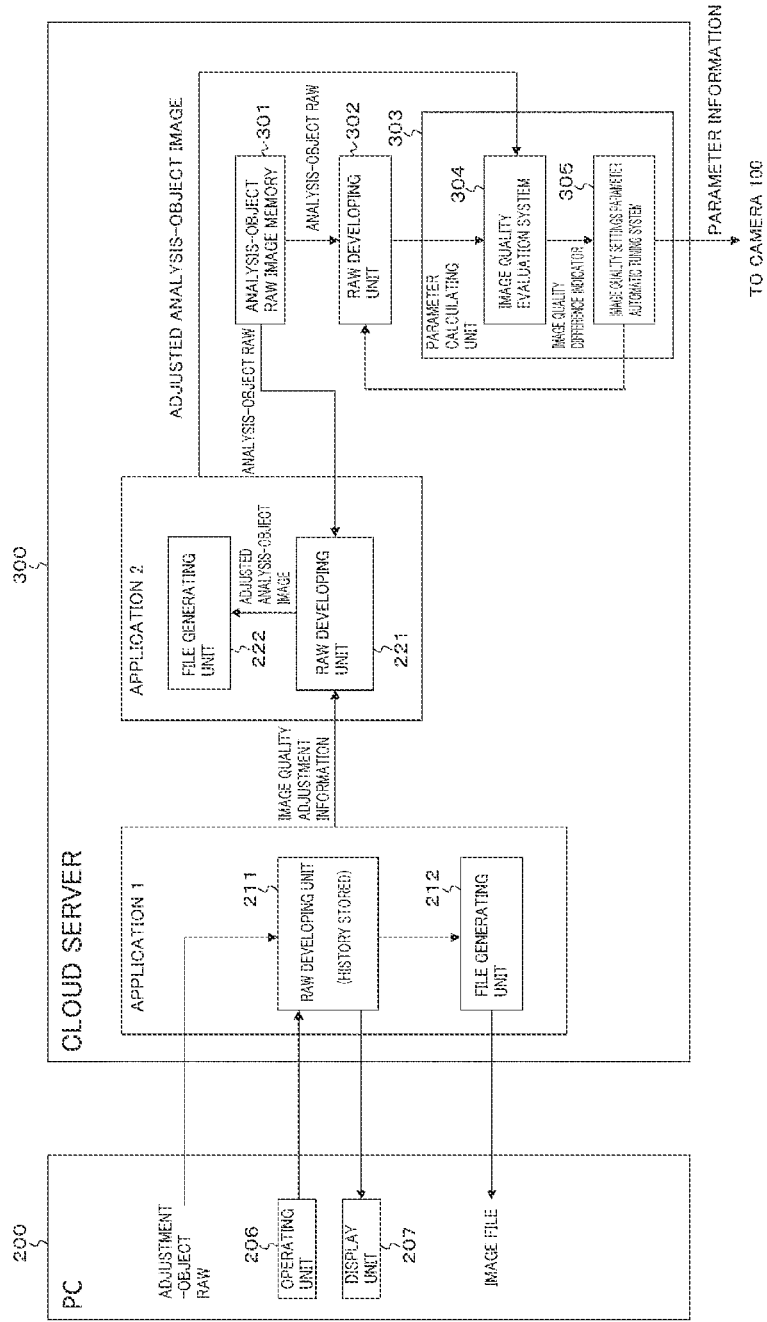
FIG. 24 is a diagram illustrating another example of the functional block diagram of the PC and the cloud server.

FIG. 24 illustrates an example of a functional block diagram of the PC 200 and the cloud server 300 in such a case. In FIG. 24, portions corresponding to FIGS. 5 and 14 are denoted by the same signs. In this example in FIG. 24, the configuration is the same as that of the example in FIG. 14 except for the application 1 and the application 2 having been moved from the PC 200 to the cloud server 300, and operations are carried out in the same manner. Accordingly, detailed description thereof will be omitted.

Note that while this example in FIG. 24 illustrates an example of directly transmitting the image quality settings parameters calculated at the cloud server 300 to the camera 100 via the network 400, an example is conceivable in which the image quality settings parameters calculated at the cloud server 300 are transmitted to the camera 200 via the PC 200, as in the example in FIG. 5.

Also, while a preferred embodiment of the present disclosure has been described in detail with reference to the attached figures, the technical scope of the present disclosure is not limited to this example. It will be apparent to one with ordinary knowledge in the technical field of the present disclosure that various modifications and alterations can be conceived within the technical spirit set forth in the Claims, all of which are to be understood to belong to the technical scope of the present disclosure as a matter of course.

Also, the effects described in the present specification are only descriptive or exemplary, and are not limiting. The technology according to the present disclosure can have other effects that are clearly apparent to one skilled in the art from the description in the present specification, along with the above-described effects or instead of the above-described effects.

The present technology may also be configured as follows.

(1) A program that causes a computer to function as an analysis-object image quality adjusting unit that, by performing image quality adjustment processing on an analysis-object RAW image that is different from an adjustment-object RAW image, on the basis of image quality adjustment information indicating an image quality adjustment value of image quality adjustment processing as to the adjustment-object RAW image, generates an adjusted analysis-object image used along with the analysis-object RAW image to decide an image quality settings parameter of a captured image acquired by an image capturing device.

(2) The program according to the above (1), wherein the image quality adjustment information includes information indicating at least one adjustment value out of color adjustment, brightness adjustment, tone adjustment, sharpness adjustment, and noise adjustment.

(3) The program according to the above (1) or (2), wherein the analysis-object image quality adjusting unit generates the adjusted analysis-object image by performing the same image quality adjustment processing on the analysis-object RAW image as the image quality adjustment processing as to the adjustment-object RAW image.

(4) The program according to any one of the above (1) to (3), wherein the image quality adjustment information is information indicating adjustment values of a plurality of image quality adjustment items, and the analysis-object image quality adjusting unit generates the adjusted analysis-object image on the basis of selected image quality adjustment information indicating an adjustment value of an image quality adjustment item selected by a user out of the plurality of image quality adjustment items.

(5) The program according to any one of the above (1) to (4), wherein the analysis-object RAW image is an image provided from an external device that is different from a device including the computer.

(6) The program according to any one of the above (1) to (5), wherein the image quality adjustment information is information indicating adjustment values of a plurality of image quality adjustment items, and the analysis-object RAW image has a plurality of image regions, and each of the plurality of image regions corresponds to at least one of the plurality of image quality adjustment items.

(7) The program according to any one of the above (1) to (6), wherein the analysis-object image quality adjusting unit generates the adjusted analysis-object image on the basis of the image quality adjustment information, in accordance with an operation of reflecting image quality settings by the user.

(8) The program according to any one of the above (1) to (7), wherein the analysis-object image quality adjusting unit correlates the adjusted analysis-object image and image type information indicating a type of image contents of the adjustment-object RAW image.

(9) The program according to any one of the above (1I) to (8), wherein the image quality settings parameter is decided for each image type information indicating the type of image contents of the adjustment-object RAW image.

(10) The program according to the above (8) or (9), wherein the image type information includes information indicating a type of subject.

(11) The program according to any one of the above (1) to (10), wherein the analysis-object image quality adjusting unit selects the analysis-object RAW image from a plurality of analysis-object RAW candidate images that are candidates for the analysis-object RAW image, on the basis of photographing conditions information indicating photographing conditions of the adjustment-object RAW image.

(12) The program according to any one of the above (1) to (11), wherein the program causes the computer to function as an image quality settings parameter deciding unit that decides the image quality settings parameter on the basis of the analysis-object RAW image and the adjusted analysis-object image.

(13) The program according to the mauve (12), wherein the image quality settings parameter deciding unit decides the image quality settings parameter such that a difference between a first image quality evaluation value indicating evaluation of image quality of an adjusted image generated by performing image quality adjustment processing on the analysis-object RAW image on the basis of the image quality settings parameter, and a second image quality evaluation value indicating evaluation of image quality of the adjusted analysis-object image, is no greater than a predetermined value.

(14) The program according to the above (13),
wherein the first image quality evaluation value and the second image quality evaluation value are evaluation values that evaluate at least one out of color reproducibility, contrast, feel of resolution, and feel of noise.

(15) The program according to any one of the above (1) to (14),
wherein the program causes the computer to function as an adjustment-object image quality adjusting unit that executes image quality adjustment processing on the adjustment-object RAW image, on the basis of the image quality adjustment information.

(16) The program according to any one of the above (1) to (15),
wherein the image quality adjustment value is decided by an image quality adjustment operation performed on the adjustment-object RAW image by the user.

(17) An information processing device including
an analysis-object image quality adjusting unit that, by performing image quality adjustment processing on an analysis-object RAW image that is different from an adjustment-object RAW image, on the basis of image quality adjustment information indicating an image quality adjustment value of image quality adjustment processing as to the adjustment-object RAW image, generates an adjusted analysis-object image used along with the analysis-object RAW image to decide an image quality settings parameter of a captured image acquired by an image capturing device.

(18) An information processing method including
an analysis-object image quality adjusting procedure of generating, by performing image quality adjustment processing on an analysis-object RAW image that is different from an adjustment-object RAW image, on the basis of image quality adjustment information indicating an image quality adjustment value of image quality adjustment processing as to the adjustment-object RAW image, an adjusted analysis-object image used along with the analysis-object RAW image to decide an image quality settings parameter of a captured image acquired by an image capturing device.

(19) An information processing system including:
an information processing device; and
a server,
wherein the information processing device includes
an analysis-object image quality adjusting unit that, by performing image quality adjustment processing on an analysis-object RAW image that is different from an adjustment-object RAW image, on the basis of image quality adjustment information indicating an image quality adjustment value of image quality adjustment processing as to the adjustment-object RAW image, generates an adjusted analysis-object image used along with the analysis-object RAW image to decide an image quality settings parameter of a captured image acquired by an image capturing device, and
wherein the server includes
an image quality settings parameter deciding unit that decides the image quality settings parameter on the basis of the analysis-object RAW image, and the adjusted analysis object image generated at the analysis-object image quality adjusting unit.

What is claimed is:

1. A non-transitory computer readable medium storing a program for analysis-object image quality adjustment, the program being executable by a processor to perform operations comprising:
performing image quality adjustment processing on an analysis-object RAW image that is different from an adjustment-object RAW image, on the basis of image quality adjustment information indicating an image quality adjustment value of image quality adjustment processing as to the adjustment-object RAW;
generating an adjusted analysis-object image; and
using the adjusted analysis-object image and the analysis-object RAW image to decide an image quality settings parameter of a captured image acquired by an image capturing device.

2. The non-transitory computer readable medium according to claim 1, wherein the image quality adjustment information includes information indicating at least one adjustment value out of color adjustment, brightness adjustment, tone adjustment, sharpness adjustment, and noise adjustment.

3. The non-transitory computer readable medium according to claim 1, wherein the operations further comprise:
generating the adjusted analysis-object image by performing the same image quality adjustment processing on the analysis-object RAW image as the image quality adjustment processing as to the adjustment-object RAW image.

4. The non-transitory computer readable medium according to claim 1, wherein the image quality adjustment information is information indicating adjustment values of a plurality of image quality adjustment items, and the operations further comprise generating the adjusted analysis-object image on the basis of selected image quality adjustment information indicating an adjustment value of an image quality adjustment item selected by a user out of the plurality of image quality adjustment items.

5. The non-transitory computer readable medium according to claim 1, wherein the analysis-object RAW image is an image provided from an external device that is different from a device including the processor.

6. The non-transitory computer readable medium according to claim 1, wherein the image quality adjustment information is information indicating adjustment values of a plurality of image quality adjustment items, the analysis-object RAW image has a plurality of image regions, and each of the plurality of image regions corresponds to at least one of the plurality of image quality adjustment items.

7. The non-transitory computer readable medium according to claim 1, wherein the operations further comprise:
generating the adjusted analysis-object image on the basis of the image quality adjustment information, in accordance with an operation of reflecting image quality settings by the user.

8. The non-transitory computer readable medium according to claim 1, wherein the operations further comprise:
correlating the adjusted analysis-object image and image type information indicating a type of image contents of the adjustment-object RAW image.

9. The non-transitory computer readable medium according to claim 1, wherein the image quality settings parameter is decided for each image type information indicating the type of image contents of the adjustment-object RAW image.

10. The non-transitory computer readable medium according to claim 8, wherein the image type information includes information indicating a type of subject.

11. The non-transitory computer readable medium according to claim 1, wherein the operations further comprise:
selecting the analysis-object RAW image from a plurality of analysis-object RAW candidate images that are candidates for the analysis-object RAW image, on the basis of photographing conditions information indicating photographing conditions of the adjustment-object RAW image.

12. The non-transitory computer readable medium according to claim 1, wherein the operations further comprise:
deciding the image quality settings parameter such that a difference between a first image quality evaluation value indicating evaluation of image quality of an adjusted image generated by performing image quality adjustment processing on the analysis-object RAW image on the basis of the image quality settings parameter, and a second image quality evaluation value indicating evaluation of image quality of the adjusted analysis-object image, is no greater than a predetermined value.

13. The non-transitory computer readable medium according to claim 12, wherein the first image quality evaluation value and the second image quality evaluation value are evaluation values that evaluate at least one out of color reproducibility, contrast, feel of resolution, and feel of noise.

14. The non-transitory computer readable medium according to claim 1, wherein the operations further comprise:
executing image quality adjustment processing on the adjustment-object RAW image, on the basis of the image quality adjustment information.

15. The non-transitory computer readable medium according to claim 1, wherein the image quality adjustment value is decided by an image quality adjustment operation performed on the adjustment-object RAW image by the user.

16. An information processing device, comprising:
a controller configured to
perform image quality adjustment processing on an analysis-object RAW image that is different from an adjustment-object RAW image, on the basis of image quality adjustment information indicating an image quality adjustment value of image quality adjustment processing as to the adjustment-object RAW;
generate an adjusted analysis-object image; and
use the adjusted analysis-object image and the analysis-object RAW image to decide an image quality settings parameter of a captured image acquired by an image capturing device.

17. An information processing system, comprising:
a memory storing a program; and
a processor configured to execute the program to perform operations comprising:
performing image quality adjustment processing on an analysis-object RAW image that is different from an adjustment-object RAW image, on the basis of image quality adjustment information indicating an image quality adjustment value of image quality adjustment processing as to the adjustment-object RAW;
generating an adjusted analysis-object image; and
using the adjusted analysis-object image and the analysis-object RAW image to decide an image quality settings parameter of a captured image acquired by an image capturing device.

* * * * *